(12) United States Patent
Takeuchi

(10) Patent No.: US 6,885,160 B2
(45) Date of Patent: Apr. 26, 2005

(54) DRIVE CONTROL

(75) Inventor: Kesatoshi Takeuchi, Nagano (JP)

(73) Assignee: Seiko Epson Corporation, Tokyo (JP)

(*) Notice: Subject to any disclaimer, the term of this patent is extended or adjusted under 35 U.S.C. 154(b) by 145 days.

(21) Appl. No.: 10/126,960

(22) Filed: Apr. 22, 2002

(65) Prior Publication Data
US 2003/0020342 A1 Jan. 30, 2003

(30) Foreign Application Priority Data

Apr. 20, 2001 (JP) .......................................... 2001-123411
Apr. 20, 2001 (JP) .......................................... 2001-123412

(51) Int. Cl.[7] .............................................. B60L 15/20
(52) U.S. Cl. ...................... 318/139; 318/269; 318/270; 388/911
(58) Field of Search ................................ 318/268, 269, 318/270, 271, 293, 375, 376, 139; 388/911

(56) References Cited

U.S. PATENT DOCUMENTS

| | | | | |
|---|---|---|---|---|
| 3,648,141 A | * | 3/1972 | Scheer | 388/812 |
| 3,697,158 A | * | 10/1972 | Mateja | 352/17 |
| 3,828,234 A | * | 8/1974 | Goldberg | 388/820 |
| 3,883,785 A | * | 5/1975 | Fulcher et al. | 318/254 |
| 4,457,639 A | * | 7/1984 | Nagai | 400/322 |
| 6,172,473 B1 | | 1/2001 | Oka et al. | |
| 6,541,930 B1 | * | 4/2003 | Gutierrez | 318/437 |
| 6,559,616 B1 | * | 5/2003 | Aoki et al. | 318/567 |

FOREIGN PATENT DOCUMENTS

| | | |
|---|---|---|
| JP | 3-222138 | 10/1991 |
| JP | 2000-261914 | 9/2000 |
| JP | 2001-47887 | 2/2001 |
| WO | WO 99/57802 | 11/1999 |
| WO | WO00/46063 | 8/2000 |

* cited by examiner

Primary Examiner—Bentsu Ro
(74) Attorney, Agent, or Firm—Nixon Peabody, LLP

(57) ABSTRACT

The present invention is a drive control device for controlling an electric rotational actuator which moves the driver, including: a reference comparison signal generation circuit; a detection circuit for detecting the speed of the actuator and outputting this as a detection signal; a speed designation circuit of the actuator; a rotation control circuit of the actuator; and a phase comparison circuit for comparing the phase of the reference comparison signal and the phase of the detection signal and outputting the comparison result to the rotation control circuit; wherein the rotation control circuit controls the speed of the actuator to conform with the speed designation based on the phase comparison result.

28 Claims, 23 Drawing Sheets

FIG.6
(1)
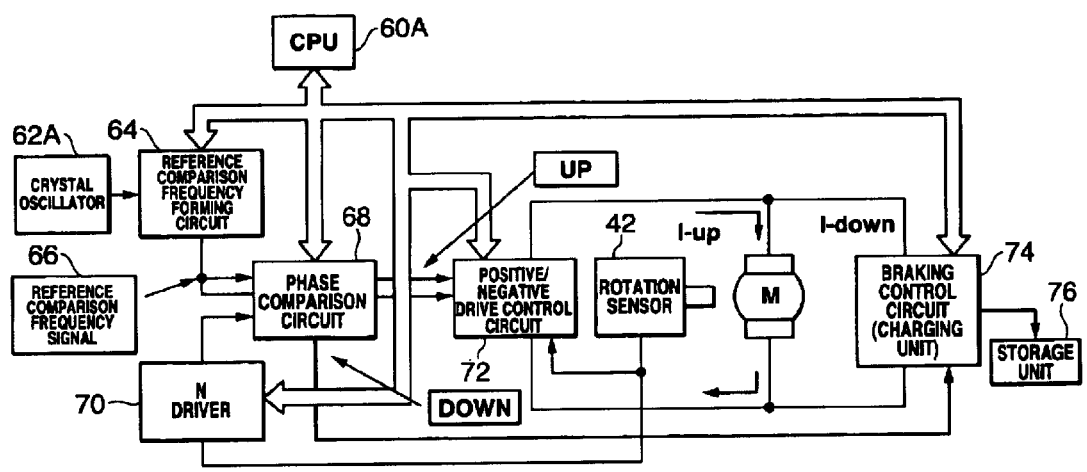
(2)
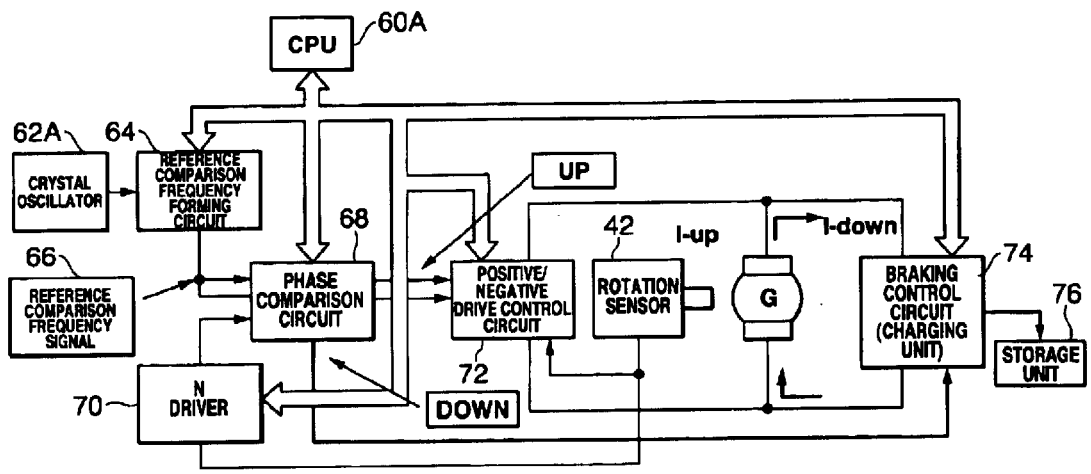

FIG.8
(1)
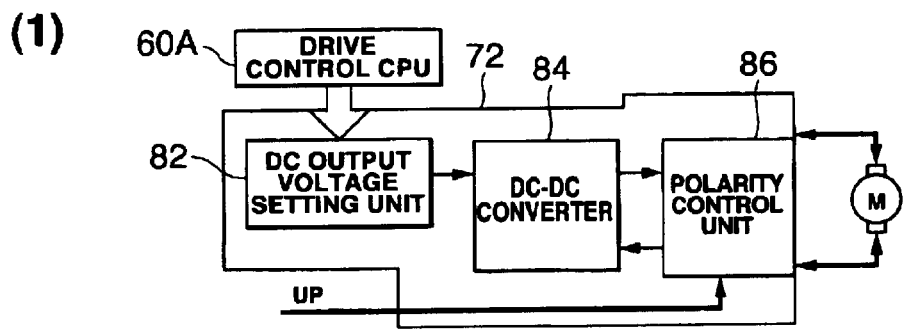
(2)
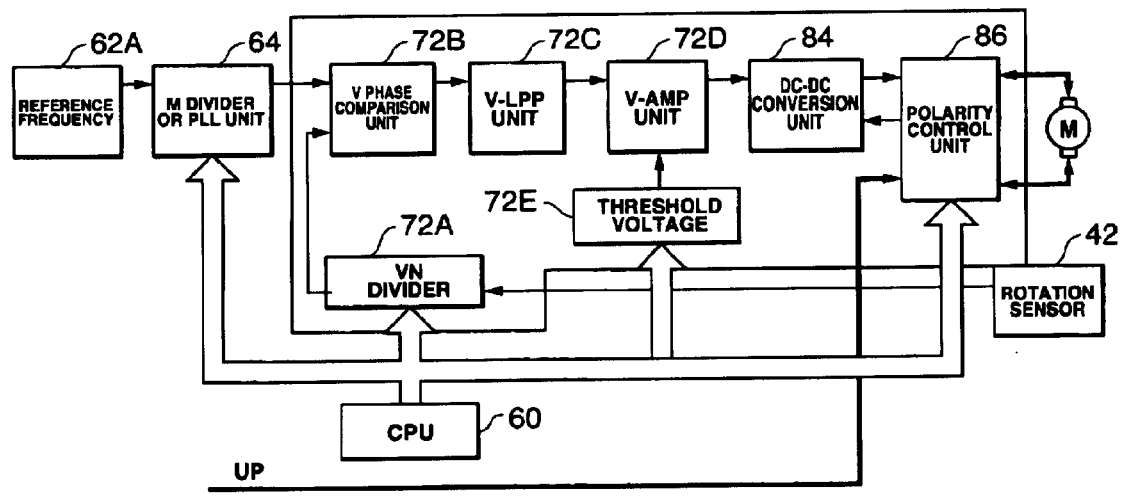

FIG.10
(1)
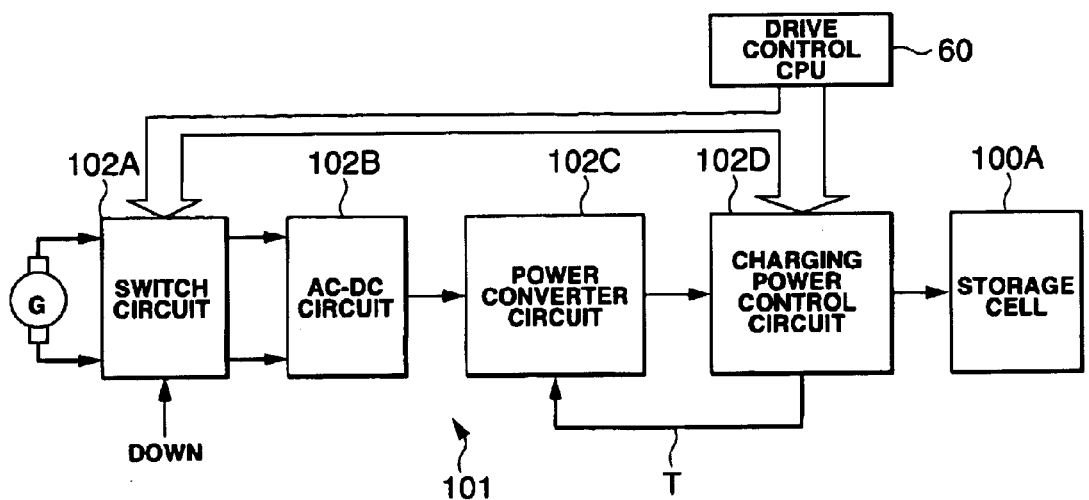
POWER INPUT AND POWER CONVERSION CHARACTERISTICS
(2)
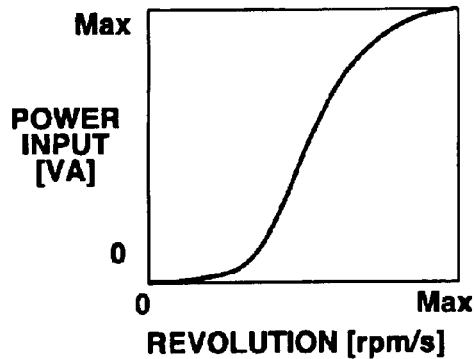
(3)
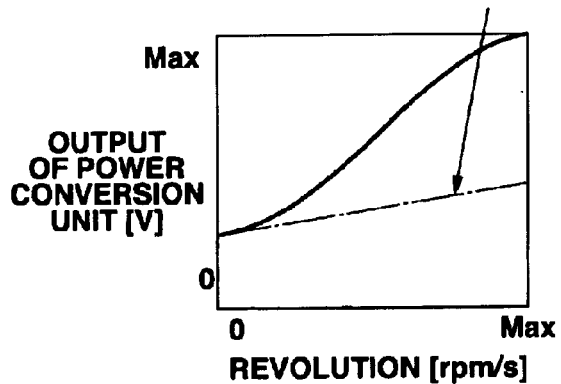

FIG.12
(1)
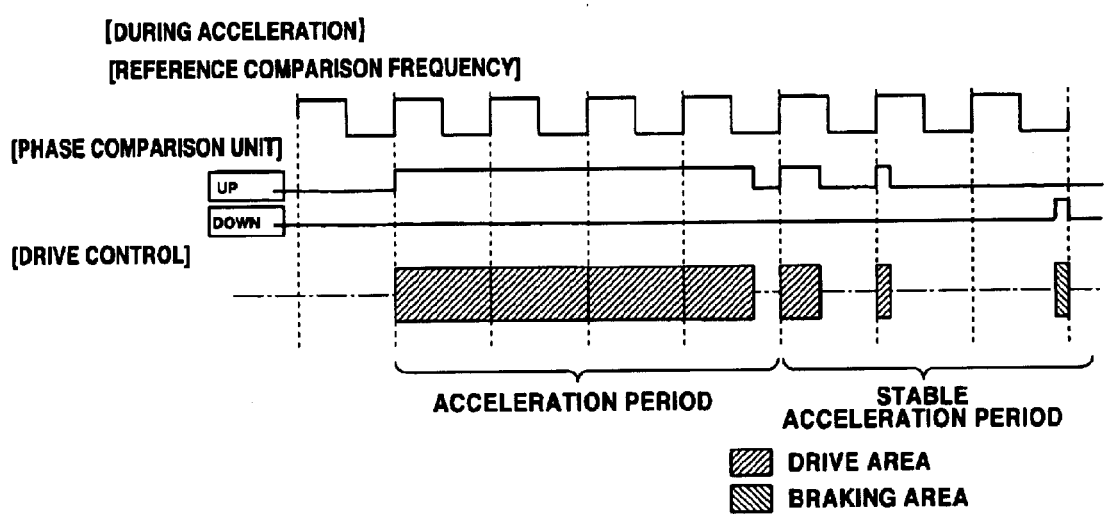
(2)
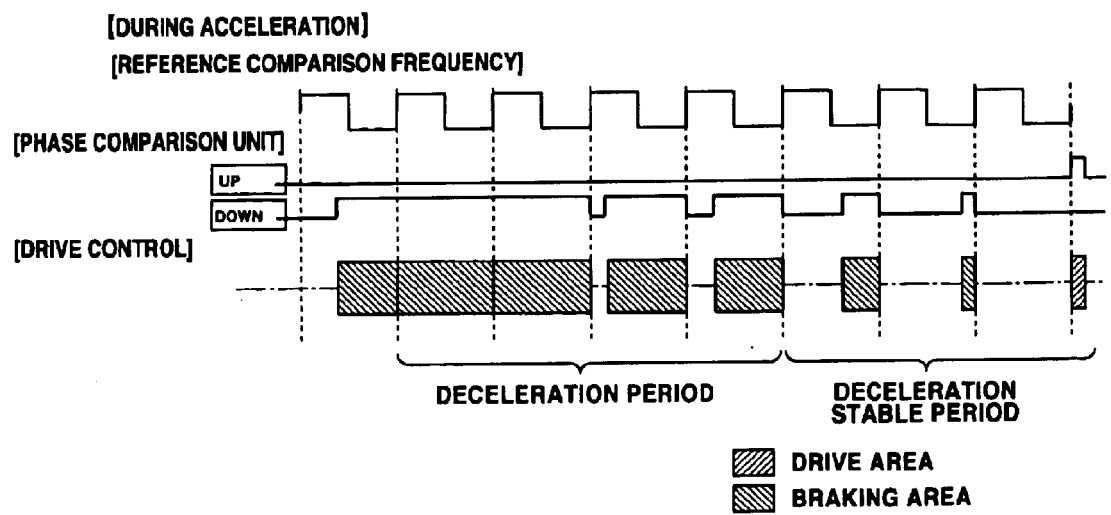

ACCELERATION-THRESHOLD VOLTAGE RATIO CONTROL CHARACTERISTICS

DECELERATION-BRAKING
LOAD VOLTAGE RATIO CONTROL
CHARACTERISTICS

SPEED-REFERENCE
COMPARISON FREQUENCY
CHARACTERISTICS

FIG.22
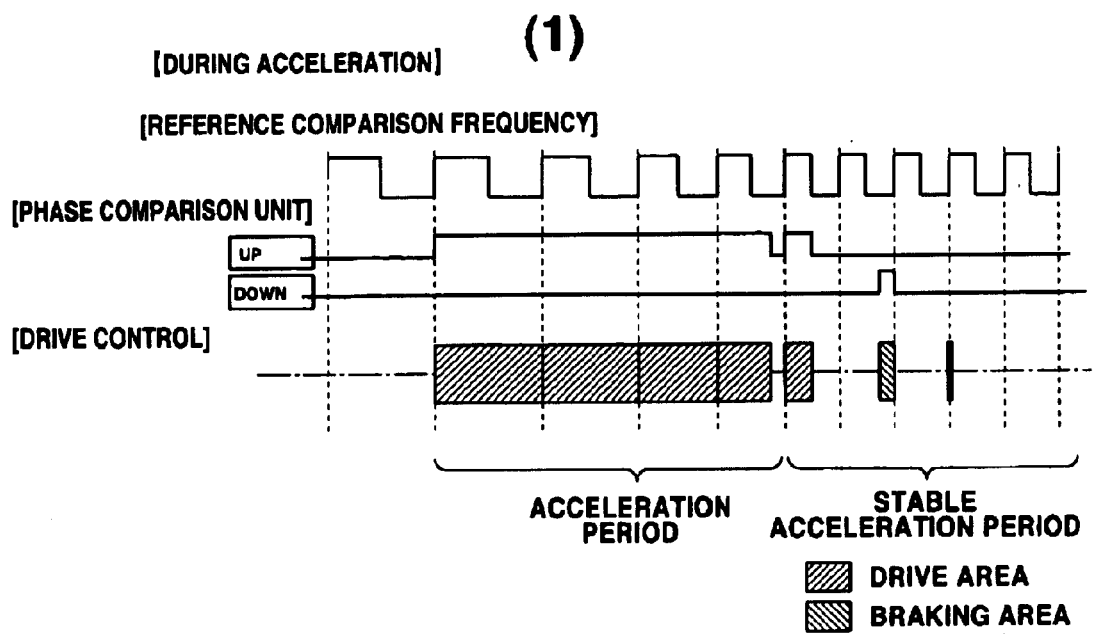
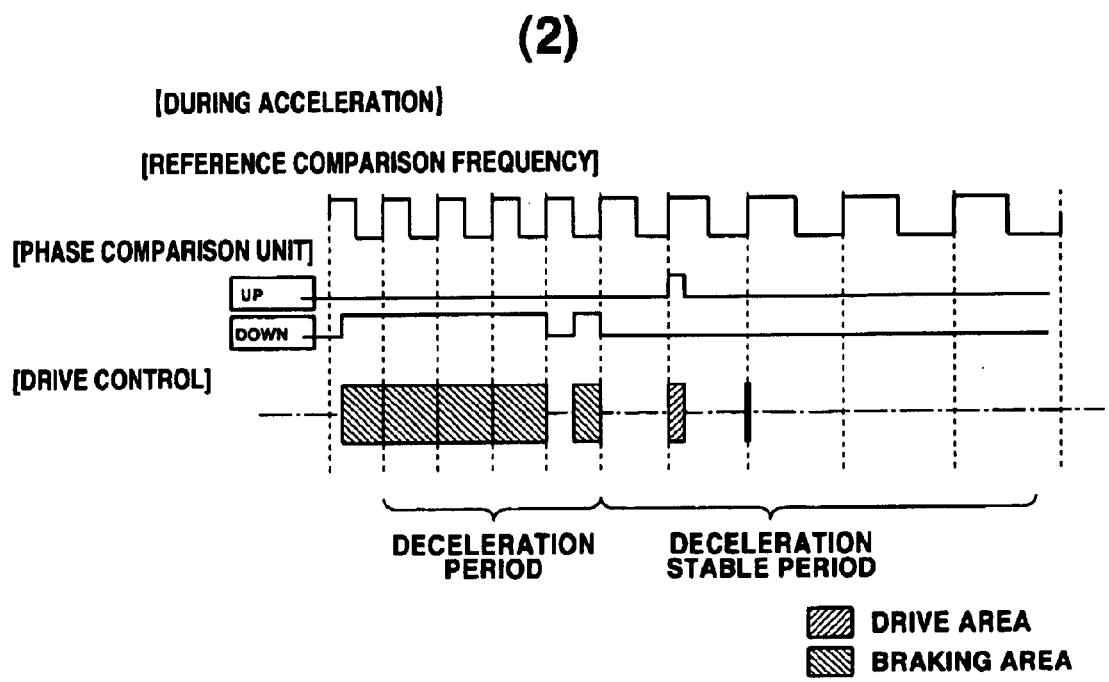

FIG.23
(1)
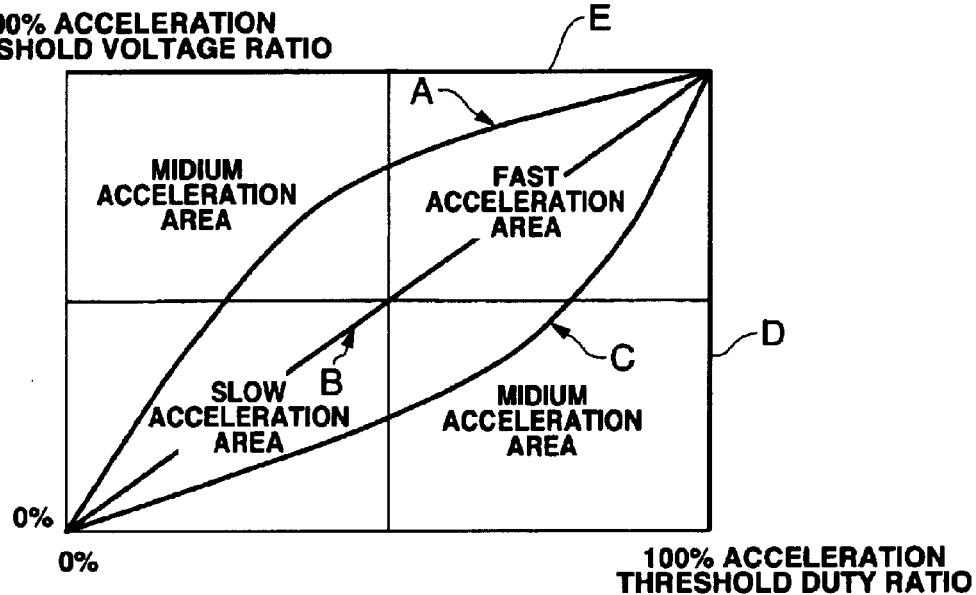
(2)
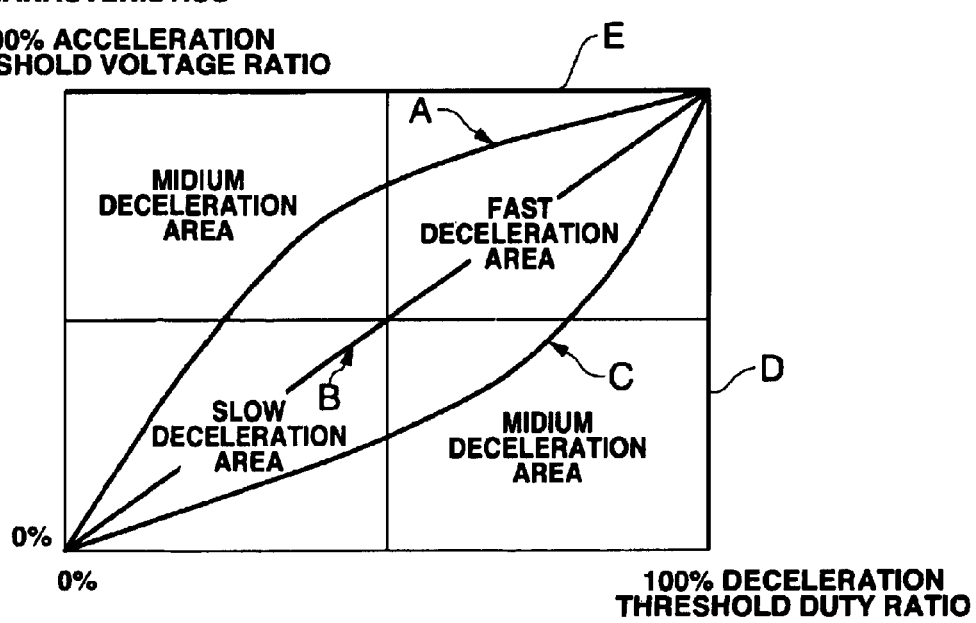

DRIVE CONTROL

BACKGROUND OF THE INVENTION

1. Field of the Invention

The present invention relates to drive control technology employed in drivers comprising an electric drive unit. As such drivers, for example, there are electric traveling vehicles such as an electric car, electric wheelchair, electric cart, and so on which in particular comprise an actuator as the electric motor. The drive control technology of the present invention may also be employed in drivers structuring electric construction machinery, electric welfare equipment, electric robots, electric toys, electric airplanes, and electric optical devices such as cameras and projectors, among others. Moreover, the present invention may also be applied to domestic electric appliances such as air conditioners, fan motors, stoves, and the like.

2. Background Art

An electric traveling vehicle moves by the drive control means rotationally controlling the electric motor. The drive control means adjusts the speed of the electric vehicle by adjusting the speed (rotational speed) of this electric motor. Speed is adjusted by making the supply voltage supplied to the electric motor variable and suppressing the power supply to the electric motor. For example, when the passenger operates the accelerator pedal or lever and the acceleration based on such manipulated variable is set in the drive control means, the electric vehicle will travel under the set acceleration. When the vehicle reaches a prescribed speed and the passenger returns the accelerator pedal or accelerator lever to a prescribed level, the speed of the electric vehicle is maintained at a prescribed value.

Meanwhile, when decelerating the vehicle, the passenger sets the accelerator pedal or accelerator lever to a position for decelerating the vehicle. The drive control means thereby performs braking control for decelerating the electric motor to a prescribed speed. When the operational status of the accelerator pedal or accelerator lever is maintained, the vehicle speed is maintained at a prescribed value.

Nevertheless, since the adjustment of the vehicle speed is not conducted by the driver, the vehicle speed would not be constant under certain travel path conditions; for example, slopes and surface frictions of the travel path, and the passenger had no choice but to frequently perform acceleration operations in order to adjust the vehicle speed.

In consideration of the above, technology referred to as cruise control is provided. This technology maintains the vehicle speed at the designated speed even though disturbances occur to the vehicle speed.

In cases of electric motors such as a stepping motor having a high control precision of rotational speed, favorable speed control can be realized. With standard AC motors or DC motors, however, only rough rotation control such as rotating when the power is turned on and stopping when the power is turned off is conducted, and technology capable of minutely and precisely controlling the rotational speed of motors has not yet been established to date.

Further, when employing a transmission means such as a continuously variable transmission, although the revolution of the end wheels could be changed precisely even when setting the rotational speed of the motor to be constant, the number of components would increase and the weight would become heavy. Thus, this is unfavorable in lightweight compact electric cars, electric wheelchairs and passenger carts requiring tight turning circles.

Moreover, the drive control means is structured of a microcomputer, and, when the electric motor is in a state of high velocity revolution, the detection signal frequency from the electric motor is high, and the drive control processing within the computer will not be in time. Thus, there is a problem in that minute and rapid control cannot be sufficiently implemented to a high-speed electric motor.

Further, since the power control loss is discharged as heat, the conversion efficiency was inferior upon converting the power energy to the drive energy of the electric driver.

In light of the above, an object of the present invention is to provide drive control technology capable of implementing control that sufficiently corresponds to high-speed motions of an electric drive unit. Another object of the present invention is to provide drive control technology enabling accurate operation of the actuator under a designated operational status. A still another object of the present invention is to provide drive control technology capable of effectively using the braking power that is generated during the braking control of the actuator. A further object of the present invention is to use PLL control as the foregoing drive control technology. A still further object of the present invention is to provide drive control technology capable of controlling the power of the electric drive unit based on the operational status of the electric drive unit in addition to the foregoing PLL control. A yet further object of the present invention is to control the motion of the electric drive unit by changing the duty of the supply voltage to the electric drive unit, or changing the voltage. A yet further object of the present is to change the braking characteristics of the actuator by controlling the braking power. A yet further object of the present invention is to provide a drive control device and drive control method comprising this drive control technology. A yet further object of the present invention is to provide a driver, particularly an electric vehicle, controlled with this drive control technology.

SUMMARY OF THE INVENTION

In order to achieve the foregoing objects, the present invention provides a drive control device for controlling an electric rotational actuator which moves the driver, including: a reference comparison signal generation circuit; a detection circuit for detecting the speed of the actuator and outputting this as a detection signal; a speed designation circuit of the actuator; a rotation control circuit of the actuator; and a phase comparison circuit for comparing the phase of the reference comparison signal and the phase of the detection signal and outputting the comparison result to the rotation control circuit; wherein the rotation control circuit controls the speed of the actuator to conform with the speed designation based on the phase comparison result.

In an embodiment of the present invention, the drive control device is structured as follows. The reference comparison signal generation circuit, the detection circuit and the phase comparison circuit structure a PLL control block. The phase comparison circuit outputs the phase difference signal to the rotation control circuit, and this rotation control circuit outputs the phase difference signal to the actuator.

The rotation control circuit distinguishes whether the actuator is in an acceleration drive state or a braking drive state from the phase difference signal, and controls the operation of the actuator based on the result thereof.

The rotation control circuit is structured of a drive control circuit for accelerating the actuator, and a braking control circuit for braking the actuator. The rotation control circuit comprises characteristic alteration means for altering the power characteristics of the actuator. The characteristic alteration means alters the duty of the actuator power. The characteristic alteration means alters the threshold value of the actuator power. The characteristic alteration means alters the duty of the actuator power in accordance with the duty of the phase difference signal.

The characteristic alteration means sets the threshold alteration ratio of the duty. Provided is a storage unit capable of storing the braking power of the actuator as the load of the braking control circuit. The braking control circuit intermittently controls the storage unit and the actuator based on the phase difference signal. The characteristic alteration means alters the duty of the load power of the actuator.

The characteristic alteration means alters the power threshold value of the load power of the actuator. The characteristic alteration means alters the duty of the power supply of the actuator. The characteristic alteration means alters the threshold value of the power supply of the actuator. The characteristic alteration means alters the duty of the actuator power and the threshold value thereof. The drive control circuit intermittently controls the drive voltage supplied to the actuator-based on the duty of the phase difference signal. The reference comparison signal generation circuit divides the fundamental frequency and outputs the reference comparison signal, and the rotation control circuit alters the division ratio in accordance with the designated value of the speed designation circuit.

The detection circuit divides the detected value from the rotation sensor of the actuator and outputs this as the detection signal, and the rotation control circuit alters the division ratio in accordance with the designated value of the speed designated circuit. The characteristic alteration means alters the power characteristics in accordance with the operational status of the actuator. The characteristic alteration means alters the power characteristics in accordance with the operational status of the driver. The characteristic alteration means alters the power characteristics when the actuator is in the transition area of acceleration or braking.

The present invention also provides a driver comprising the drive control device, and an electric drive unit drive-controlled with this drive control device. The present invention further provides an electric traveling vehicle comprising the drive control device, and an electric drive unit drive-controlled with this drive control device.

The drive control method of the present invention is a drive control method for controlling an electric rotational actuator which moves the driver, comprising: a reference comparison signal generation step; a detection step for detecting the speed of the actuator and outputting this as a detection signal; a speed designation step of the actuator; a rotation control step of the actuator; and a phase comparison step for comparing the phase of the reference comparison signal and the phase of the detection signal and outputting the comparison result to the rotation control circuit; wherein the speed of the actuator is made to conform with the speed designation based on the phase comparison result.

BRIEF DESCRIPTION OF THE DRAWINGS

FIG. 6 is a block diagram for performing the advance control of the drive wheel (real wheel);

FIG. 8(1) is the first embodiment of the motor drive voltage application circuit of the drive control circuit, and (2) is the second embodiment thereof;

FIG. 10 is a block diagram of the braking control circuit and the control characteristics thereof;

FIG. 12 is a waveform diagram of the motor drive/braking control timing;

FIG. 22 is a timing chart of the acceleration/braking of the motor upon changing the reference comparison frequency;

FIG. 23 is a pattern diagram of the control characteristics upon controlling the actuator power with the combination of the foregoing duty and voltage control.

DESCRIPTION OF THE PREFERRED EMBODIMENTS

Figure 1:
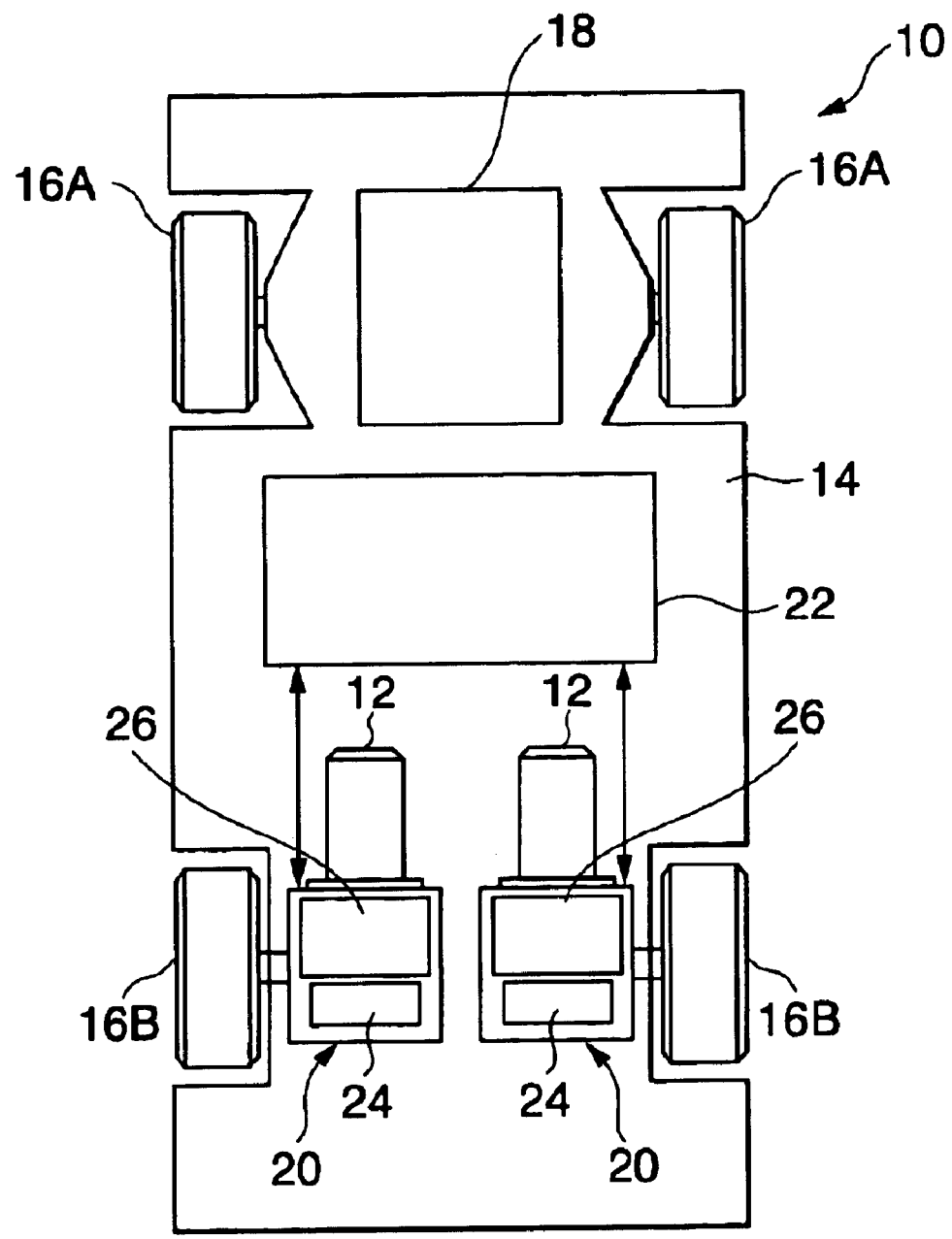
FIG. 1 is a plan view of the vehicle according to the present embodiment.

FIG. 1 shows the electric vehicle 10. The upper side of the diagram is the advancing side of the electric vehicle. This vehicle 10 is driven with an electric motor (stepping motor 12). The vehicle body is provided with a pair of wheels 16 at the front and rear thereof. Reference numeral 16A shows the two front wheels and reference numeral 16B shows the two rear wheels. These four wheels 16 ground and support the vehicle 10 on the road surface.

The front wheels 16A are the steering wheels steered by the passenger, and in the present embodiment, the front wheels 16A may be turned to the left and right with the steering control unit 18 based on the steering operation of the passenger. Moreover, the front wheels may also be electrically rotation-controlled with the likes of a motor, or the steering operation of the passenger may be mechanically conveyed to the front wheels. Further, the vehicle may be steered by altering the rotational speed of the respective rear wheels (drive wheels).

Figure 2:
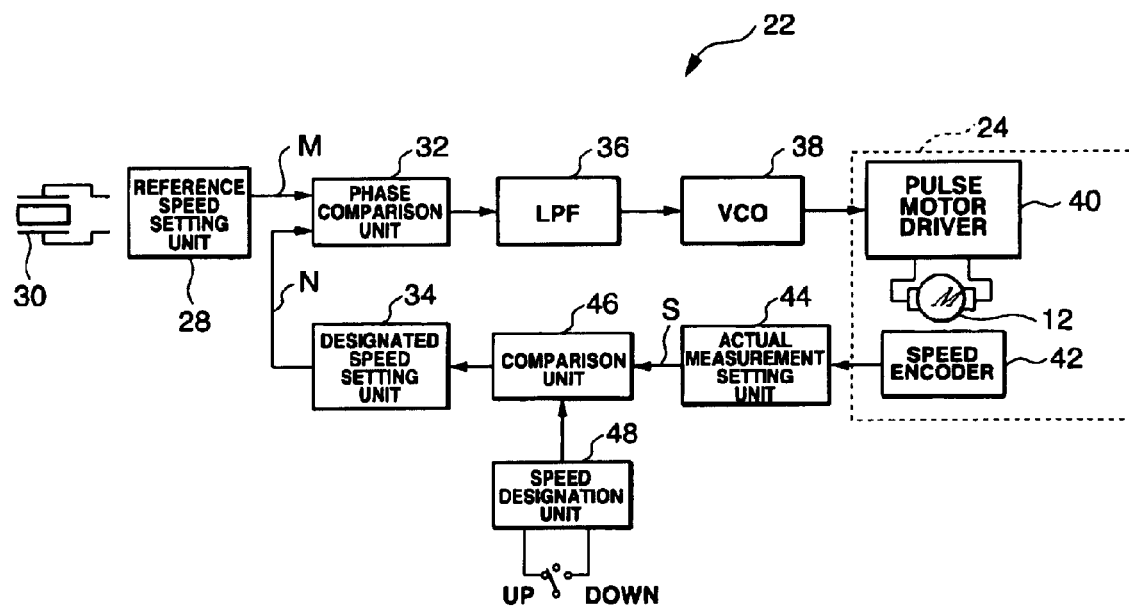
FIG. 2 is a block diagram of the automatic speed control employing the PLL circuit in relation to the present embodiment.

Meanwhile, each of the rear wheels 16B is connected to the motor drive mechanism 20. This drive mechanism is controlled with the motor drive first control block 22 (c.f. FIG. 2). The motor drive mechanism 20 comprises a second control block 24 for controlling the drive of the pulse motor 12, and a transmission mechanism 26 for transmitting the driving force of the motor to the axel 16B. The drive mechanism rotationally drives the pulse motor 12 based on the control signal of the control block 22.

FIG. 2 shows the mechanical diagram of the control block 22. The control block 22 utilizes the PLL control to compare the phase of the reference comparison frequency signal and the phase of the detected frequency signal of the electric motor, and thereby controls the operation of the electric motor 12.

Reference numeral 28 is the reference speed setting unit 28, and comprises a crystal oscillator 30. A reference comparison frequency signal can be obtained by dividing the fundamental frequency signal oscillated from the crystal oscillator. The reference speed setting unit 28 divides the foregoing fundamental frequency signal in order to create the comparison signal. The division ratio (rate) is altered by the designated speed against the motor. The reference frequency signal M obtained thereby is input to the phase comparison unit 32 structuring a part of the PLL control block. The designated speed of the vehicle (motor) is set in the speed designation unit described later.

A frequency signal N is input to the phase comparison unit 32 from the designated speed setting unit 34, and the phase comparison unit 32 compares the frequency signal M and frequency signal N and outputs the phase difference thereof as the phase difference signal to the LPF (Low Pass Filter) 36.

The LPF 36 outputs the control voltage signal, which is obtained by eliminating high frequency components such as noise upon integrating the phase difference signal, to the VCO (Voltage Control Oscillation Circuit) 38. The clock (frequency) signal from the VCO 38 is output to the pulse motor driving driver 40 of the control block 24. Thus, the pulse motor 12 is driven in accordance with the phase difference of the phase comparison unit 32.

The pulse motor 12 is provided with a rotation speed encoder 42 (rotational speed detector). This speed encoder 42 outputs a pulse signal of the frequency corresponding to the rotation of the respective rear wheels. This encoded signal is stored as the frequency signal S of the rear wheel driving motor in the actual measurement setting unit 44.

This frequency signal S is input to the comparison unit 46. In the comparison unit 46, the frequency signal corresponding to the designated rotational speed of the rear wheel and the actual measurement frequency signal S are compared to calculate the difference between the two, and it is decided whether the rotation of the rear wheels should be increased or decreased, as well as with what degree of acceleration the rotation should be increased or decreased in order to determine the N value (divided value).

The comparison unit 46 or the designated speed setting unit 34 N divides the frequency signal S and sets this as the designated speed frequency signal in the designated speed setting unit 34. The designated speed frequency signal N is output from the designated speed setting unit 34 to the phase comparison unit 32.

Therefore, control in which the phase of frequency signal M and the phase of frequency signal N coincide is implemented as described above, and the rotation of the real wheels is controlled such that the vehicle speed is converge-controlled to the designated speed. According to the foregoing control structure, the control of rotational speed of the rear wheels is accurate with the PLL control system, and is conducted with ease and expedition.

Figure 3:
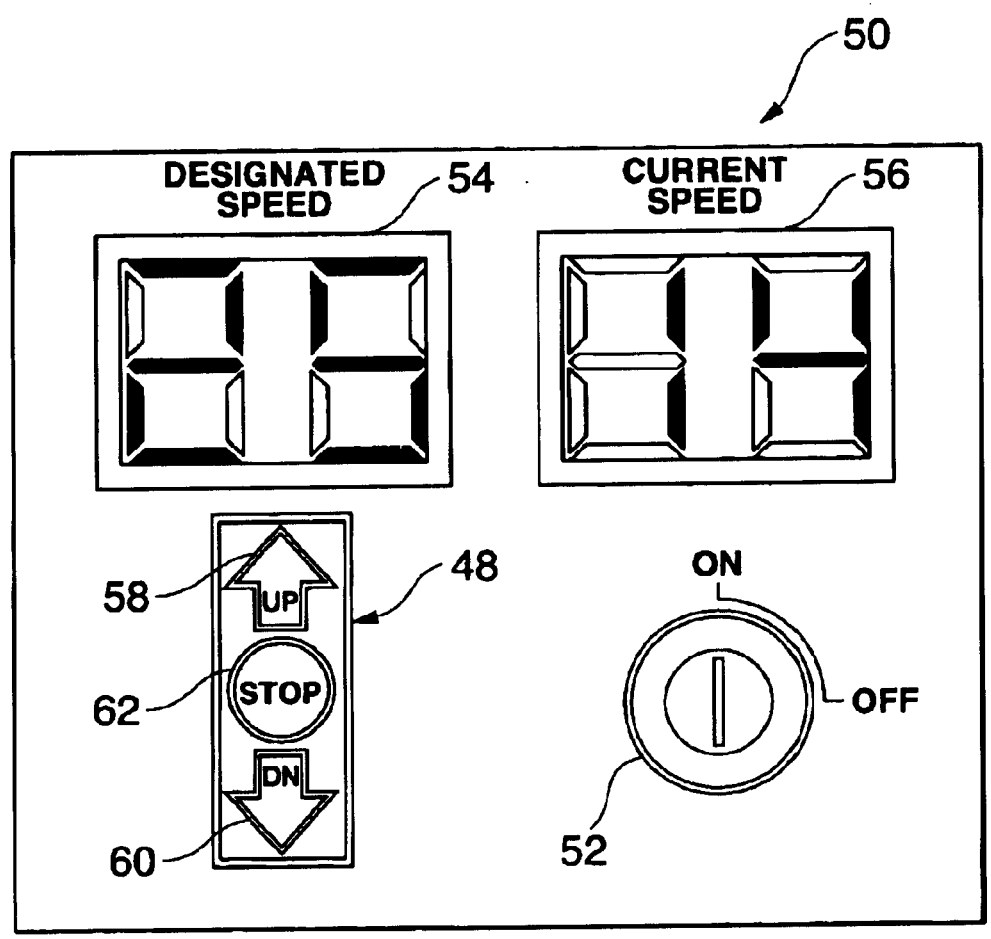
FIG. 3 is a front view of the instrument panel of the vehicle.

FIG. 3 shows an instrument panel 50 provided to the driver's seat to which the passenger of the vehicle 10 will board. An ignition key cylinder 52 is provided to this instrument panel 50, and the control of this drive system is commenced by the passenger inserting the key into the ignition key cylinder 52 and turning the key to the ON position.

Further provided to the instrument panel 50 are a designated speed display unit 54 for displaying the designated speed of the motor, and a current speed display unit 56 for displaying the current speed. The passenger is thereby able to visually compare the designated speed displayed on the designated speed display unit 54 and the current speed displayed on the current speed display unit 56. Moreover, although the display units 54 and 56 were respectively represented as a 7-segment display in FIG. 3, the representation may be a dot-matrix display or an analog display.

In addition, the instrument panel 50 is provided with a speed designation unit 48 for designating the speed. This speed designation unit 48 is separated into an acceleration key 58, a deceleration key 60, and a stop key 62. By continuously operating the acceleration key 58, the target designated speed of the vehicle can be increased at a fixed rate, and the results thereof are successively displayed on the designated speed display unit 54.

Further, by continuously operating the deceleration key 60, the target designated speed of the vehicle can be decreased at a fixed rate, and the results thereof are successively displayed on the designated speed display unit 54. The stop key 62 is for instantaneously making the vehicle target speed zero, and, pursuant to the operation of the stop key 62, the vehicle is decelerated at a prescribed acceleration and stopped thereby. Moreover, a separate key or pedal may be separately provided for stopping the vehicle, particularly for the purpose of emergency braking. Members represented with reference numerals 28 and 30 illustrated in FIG. 1 and FIG. 2 correspond to the reference comparison signal generation circuit, the respective members represented with reference numerals 42, 44, 46 and 34 correspond to the detection circuit, the member represented with reference numeral 48 corresponds to the rotational speed designation circuit, and the respective members represented with reference numerals 32, 36 and 38 correspond to the phase comparison circuit. In addition, the drive control device according to the present invention is controlled with a microcomputer not shown.

Figure 4:
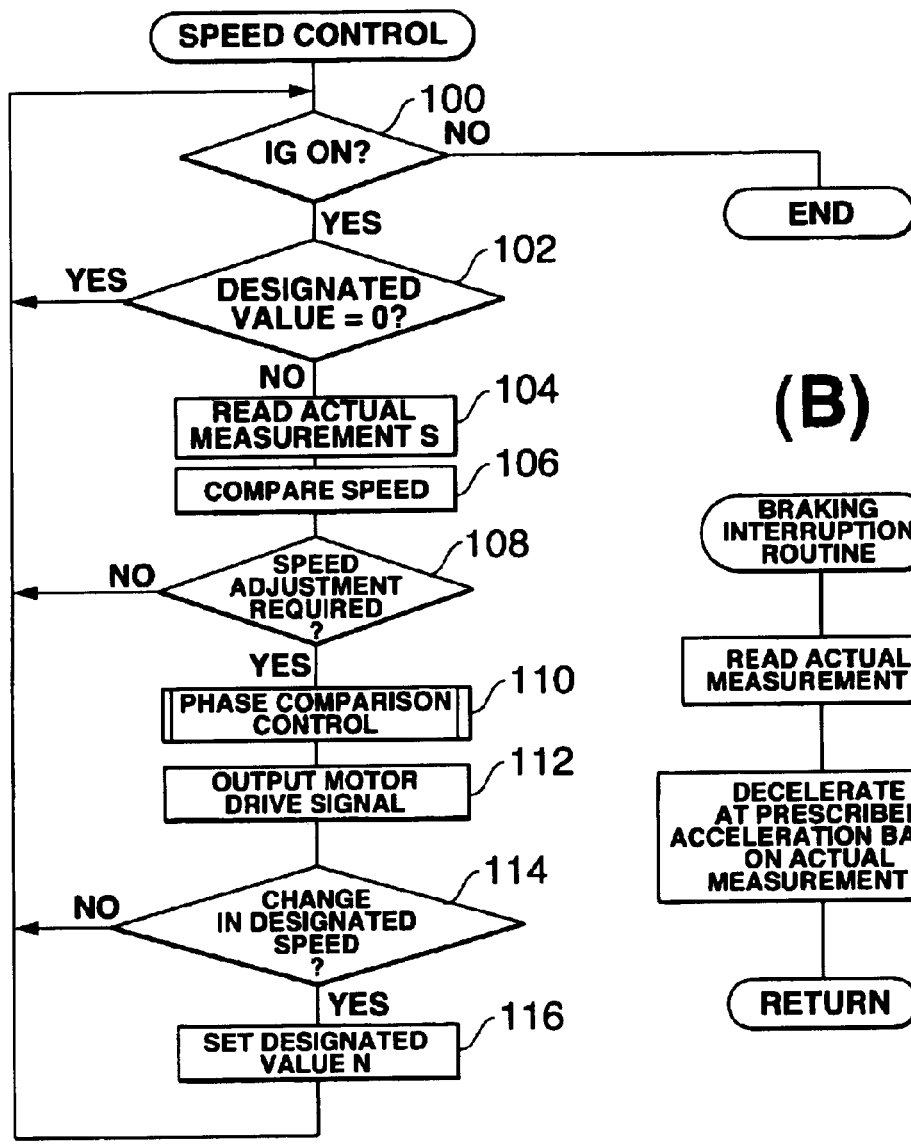
FIG. 4 is a vehicle speed control flowchart pursuant to PLL control in relation to the present embodiment.
Figure 5:
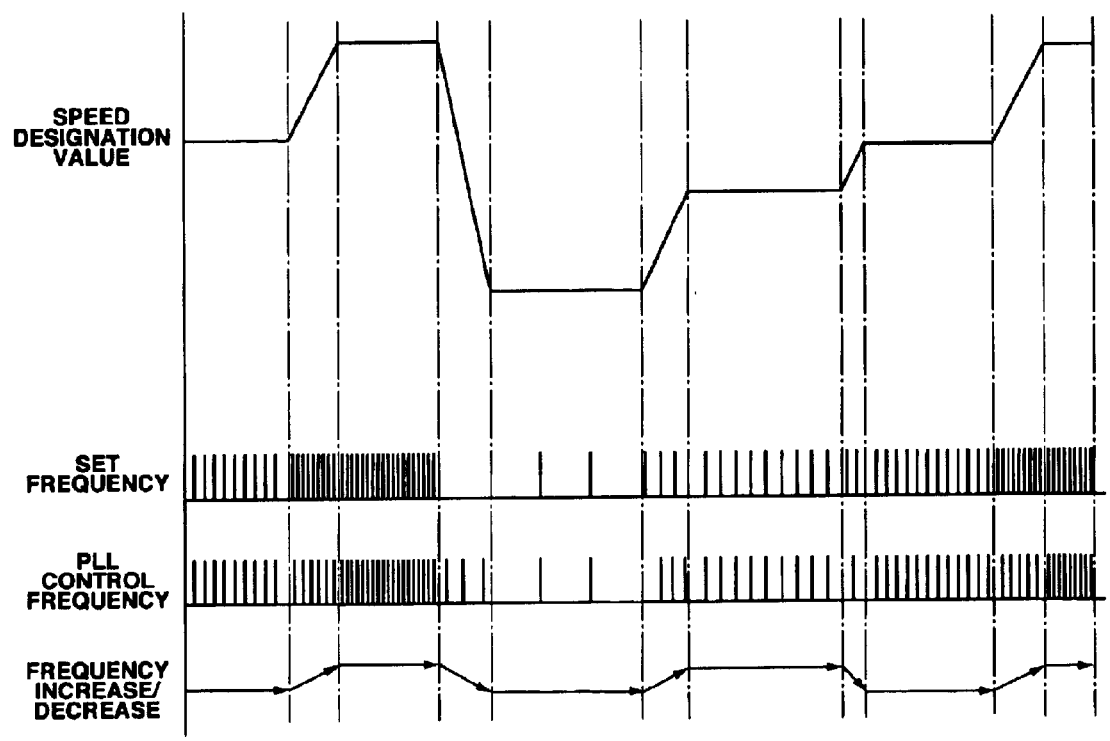
FIG. 5 is a timing chart for showing the speed change state pursuant to PLL control in the case of changing the designated speed.

The flow of the motor drive control is described below with reference to the flowchart of FIG. 4 and the timing chart of FIG. 5.

Foremost, at step 100 of the speed control routine shown in FIG. 4(A), it is judged whether the key has been inserted in the ignition key cylinder 52 to place the vehicle in the ON state, and, when this is judged as positive, the routine proceeds to step 102.

At step 102, it is judged whether the designated speed is 0, and, when this is judged as positive, the routine returns to step 100 since the designated speed is 0. Moreover, when it is judged as negative in this step 102, the routine proceeds to step 104 since it is judged that there is a speed designation.

At step 104, the rotational speed of the rear wheels is measured with the speed encoder 42 and the actual measurement S thereof is read. At the subsequent step 106, the designated speed and actual speed of the vehicle (motor) are compared, and, when there is a speed difference between the two, since it is necessary to adjust the speed, it is judged in step 108 as to whether speed adjustment is required.

At step 108, when it is judged that speed adjustment is not required (negative judgment), it is determined that the current speed is stable at the designated speed, and the routine returns to step 100. Moreover, at step 108, when it is judged that speed adjustment is required, the routine proceeds to step 110 in order to perform speed control with PLL control. At step 110, as described above, the frequency signal phase is compared in the phase comparison unit 32, and the drive of the drive wheels (rear wheels) is controlled based on the phase difference. In other words, as illustrated in step 112, frequency M to become the reference is supplied to the PLL circuit in order to drive-control the electric motor 12 of the respective drive wheels such that the current rotational speed of the rear wheels becomes frequency N of the designated rotational speed.

At the subsequent step 114, it is judged whether the designated speed has been altered. In other words, it is judged whether the designation unit 48 of the instrument panel 50 has been operated or not, and, when the designated speed has not been altered, the routine returns to step 100, and the vehicle 10 is travel-controlled with the current designated speed and traveling direction.

Here, when the designated speed has been altered at step 114, since the operation result of the speed difference at the comparison unit 46 will change, the routine proceeds to step 116 in order to set the frequency signal N corresponding to the designated speed, and, thereafter, the speed is controlled with the frequency signal N after the alteration thereof.

When the stop key 62 is operated during the control routine described above, the braking interruption routine shown in FIG. 4(B) is activated, and, in addition to the actual measurement S of the motor rotation being read at step 120, deceleration at a prescribed acceleration (minus) based on the actual measurement S is commenced at step 122. As a result, the vehicle 10 will stop after the vehicle speed is converged to zero.

Next, control from the phase comparison unit 32 to the driver 40 via the VCO 38 is explained with reference to the timing chart illustrated in FIG. 5 in a case where the vehicle 10 is actually driven by repeating acceleration and deceleration. Moreover, in FIG. 5, explained as the control parameters are the speed designation value, set frequency signal N, PLL control frequency signal M, and vector value representing the frequency increase/decrease.

Although the example shows a mode where the vehicle 10 is advancing directly forward, when the vehicle is steered, each of the rear wheels is controlled at a different speed designation value so as to generate a rotational speed difference in the respective wheels 16B. Exemplified is the change in the speed designation value against the time axis, and the upward direction of the vertical axis represents high speed, and the downward direction represents low speed. Moreover, the vector display corresponding to the frequency increase/decrease implies that the frequency of the set frequency signal N is being increased (accelerated) in order to increase the rotational speed of the motor when the vector is facing the upward direction in the diagram, and, contrarily, implies that the frequency is being lowered (decelerated) when facing the downward direction. Further, when the vector is parallel against the time axis, such portion implies that the vehicle is being maintained in a constant speed state upon making the frequency of the set frequency signal N to be constant.

When the speed designation value is raised, the set frequency N foremost becomes higher in accordance therewith, and the PLL control frequency M thereafter becomes higher (area in which the frequency vector turns upward). Further, when the speed designation value of the vehicle is lowered, the set frequency N foremost becomes lower in accordance therewith, and the PLL control frequency M thereafter becomes lower (area in which the frequency vector turns downward). Further, when maintaining the speed, the set frequency N and the PLL control frequency M coincide (area in which the frequency vector is horizontal). The aforementioned control is realized with the PLL control system based on the phase difference between frequency signals N and M.

As described above, with the present embodiment, the frequency phase comparison control with the PLL circuit is employed in the speed control of the vehicle 10, and, since the PLL circuit is used to control the drive status of the pulse motor 12, the vehicle speed is automatically increased or decreased to the previously designated speed. Further, since the vehicle travels steadily at this speed when the vehicle speed reaches the designated speed, burden on the passenger can be alleviated. This type of speed control is optimum for the control of electric wheelchairs. Further, according to the foregoing speed control, since the passenger is not required to needlessly increase the vehicle speed, the power consumption of the electric motor can be kept to a minimum, and this is optimum in vehicles where power is limited; for example, in future solar cars and the like.

In the present embodiment, the speed encoder 42 is employed as the speed detection means, and, by monitoring the rotation of the pulse motor 12, the speed of the vehicle 10 is obtained. Nonetheless, the speed may also be detected by employing a non-contact sensor which emits a laser beam or infrared ray from a light emitting element toward the road surface, detects the reflection thereof, and analyzes the AC component.

As this type of non-contact speed probe, broadly employed may be those which are well-known and applied to technology for detecting the movement speed of mice of PCs or the speed of a baseball or golf ball (For example, please refer to Japanese Patent Laid-Open Publication No. H6-313749, or Japanese Patent Laid-Open Publication No. H7-134139.).

As a result of employing this type of non-contact sensor, for example, it is possible to prevent the erroneous speed detection during the idling in a case where the speed encoder 42 is provided to the actuator (pulse motor 12) as described in the present embodiment.

Moreover, when disposing the speed encoder 42 in a wheel which does not have a driving force; for example, an auxiliary wheel, the rotational lock speed will be detected with the auxiliary wheel locking phenomenon pursuant to an external object. This kind of inconvenience can also be overcome by employing a non-contact sensor.

Next, another embodiment of the drive control device according to the present invention is described. FIG. 6 is a block diagram for performing the advance-control of the drive wheels (rear wheels). FIG. 6(1) is a control block diagram in the case of accelerating the motor, and FIG. 6(2) is a block diagram in the case of performing braking control to the motor. Reference numeral 60A represents a microcomputer which performs the overall control. Various data for driving the vehicle are input to this microcomputer; for example, the detected value or designated value of the vehicle speed from the rotation sensor 42 of the drive wheels, or the shift status in the advance or reverse direction.

Reference numeral 62A is a crystal oscillator for oscillating the fundamental frequency. The fundamental oscillation frequency is input to the reference comparison frequency signal forming circuit 64 structured from the M divider or PLL circuit, and generates a prescribed reference comparison frequency signal 66 divided thereupon. The reference comparison frequency signal is input to the phase comparison circuit 68. The microcomputer 60A sends the control signal for altering the division characteristics (division ratio), which divides the fundamental frequency with the operational status (speed) of the actuator, to the reference comparison frequency forming circuit 64.

The detection signal from the rotation sensor 42 which generates a pulse in accordance with the rotation of the electric motor M (DC motor) is input to the phase comparison circuit 68 once again. Reference numeral 70 is the N divider which N divides this detection signal. The N divided detection signal is input to the phase comparison unit 68, and the phases of the two frequency signals are compared in the phase comparison unit.

Reference numeral 72 is a drive control circuit for applying a drive voltage for driving the motor and supplying the drive current (I-up) to the motor. The drive control circuit switches the polarity of the drive current (voltage) in conformity with the forward advancement or reverse travel of the vehicle. Reference number 74 is a braking control circuit for decelerating the motor.

Reference numeral 76 is the load (storage unit) connected to the braking control circuit. I-down (c.f. FIG. 6(2)) is the braking current flowing in the braking control circuit. During the deceleration of the motor, the motor is separated from the power source so as to function as a power generator (G), and braking is applied to the motor with the braking current flowing to the braking control circuit. Based on the phase comparison result in the phase comparison unit 68, the drive control circuit 72 and the braking control circuit 74 are switched and connected to the motor.

Further, when the rotational direction of the motor is of a direction which will back up the vehicle, this is similar to the control block illustrated in FIG. 6 except for the difference in polarity of the drive current and braking current.

When seeking the phase difference of the two frequency signals in the phase comparison circuit 68, and the motor is accelerated because the actual speed of the motor is slower than the designated speed, as shown in FIG. 6(1), the control signal (UP) is sent to the drive control circuit 72, and the motor M and the drive control circuit 72 are connected so as to apply a drive voltage to the motor M. Here, the braking control circuit 74 is not connected to the motor M. Meanwhile, when applying a brake to the motor, as shown in FIG. 6(2), the control signal (DOWN) for decelerating the motor is sent to the braking control circuit 74, and, in addition to separating the motor G (a power generator in-this case) from the driving power supply power source, it is connected to the load (storage unit 76). Here, the motor G is not connected to the drive control circuit 72.

As described above, the computer 60A controls the overall drive control device pertaining to FIG. 6, and controls the reference comparison frequency forming circuit 64, phase comparison circuit 68, drive control circuit 72, N divider 70, and braking control circuit 74. The microcomputer detects the operational status, such as the rotational speed of the motor M (G) and the vehicle status with a sensor, judges the operational status of the motor and vehicle, and controls the operational status of the motor by altering the characteristic value of the driving power and braking power of the motor based on the judgment results thereof.

One method of altering the power characteristic value is to set the threshold value against the duty of the phase difference signal (UP/DOWN) output from the phase comparison circuit 68 in order to alter the duty of the driving power and braking power (ratio of ON/OFF time per time unit). For example, the threshold duty ratio being 100% implies that the duty of the phase difference signal is output as is to the drive control circuit 72 or the braking control circuit 74. The threshold duty ratio being 50% implies that the duty of the phase difference signal is limited to 50% or less. In other words, when the threshold duty ratio is X %, the duty of the phase difference signal is limited to X/100 thereof. Therefore, in order to achieve the speed control (acceleration/deceleration control) of the motor having the same quantity where the duty is 100%, (100/X) multiplied by the time will be required. Thus, more the threshold duty ratio is lowered, the more gradual the speed change of the motor will become.

Figure 7:
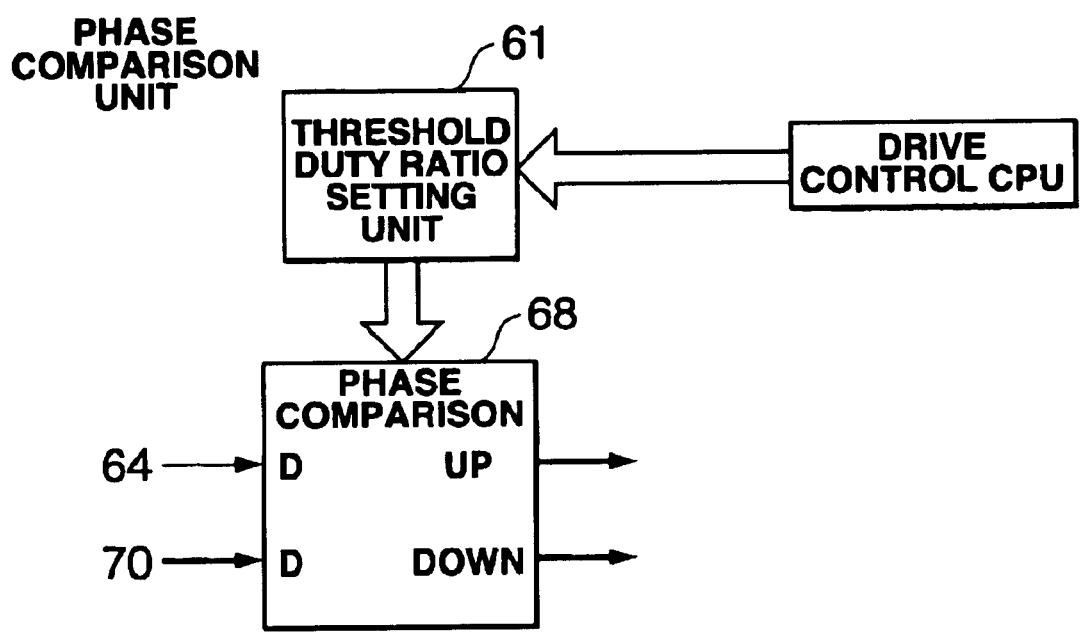
FIG. 7 is a block diagram for changing the duty of the phase difference signal output from the phase comparison unit.

FIG. 7 is a block diagram for altering the duty of the phase difference signal output from the phase comparison unit 68. The microcomputer 60A sets the threshold duty ratio appropriate in the operational status of the vehicle or motor in the threshold duty ratio setting unit 61. The phase comparison circuit 68 alters the duty of the phase difference signal upon referring to this set duty ratio upon outputting the phase difference signal.

FIG. 8(1) is the first embodiment of the motor drive voltage application circuit of the drive control circuit 72, and FIG. 8(2) is the second embodiment thereof. The circuit depicted in FIG. 8(1) is structured by comprising a DC output voltage setting unit (circuit) 82 for converting the control signal from the computer 60A into an analog signal and setting the DC output voltage, a DC-DC converter (circuit) 84 for pressurizing the DC output voltage, and a polarity control unit (circuit) 86 for altering the polarity of the DC voltage. The microcomputer 60A judges whether the electric motor M is in an operational state of advancing or in an operational state of moving in reverse, and outputs to the polarity control unit 86 the control signal for switching, as described above, the polarity of the drive voltage to be applied to the motor M from the polarity control unit 86.

The phase difference signal (UP) is input from the phase comparison circuit 68 to the polarity control unit 86. As described above, when the phase difference signal (UP) is output to the drive control circuit 72, the drive control circuit 72 is connected to the motor. When the H level (on time) of the phase difference signal (UP) is input to the polarity control unit 86, the motor driving voltage is applied to the motor M.

The DC/DC converter 84 is mainly structured of a so-called inverter, and comprises the function of converting the direct current into an alternate current, and converting this alternate current into a direct current. In other words, when a DC voltage of a prescribed value is input, an AC voltage is generated based on this DC voltage. The AC voltage frequency is changed based on the voltage detected in the voltage detector provided to the DC/DC converter.

The change in frequency will be the change in the actual value of the AC voltage. The alternate current in which the frequency has been changed (change in voltage) is reconverted into a direct current, and output from the output unit of the DC/DC converter. Since the drive voltage of the polarity control unit 86 is returned to the voltage detector of the DC/DC converter, a drive voltage having a stable voltage is output from the DC/DC to the polarity control unit.

The microcomputer 60A sets a control signal for changing the voltage of the drive voltage to be applied to the motor in the DC output setting unit 82. This change in voltage corresponds to the aforementioned second embodiment of altering the power characteristics of the actuator. The mode of voltage change is set as the ratio of voltage after alteration and the voltage before alteration. For example, the threshold voltage ratio being 50% implies that the voltage is decreased up to 50% of the maximum value of the voltage. The lower the threshold voltage ratio, the smaller the acceleration/deceleration of the motor, and the speed change of the vehicle will be alleviated thereby.

FIG. 8(2) is a second example of the drive voltage control circuit. This control circuit comprises a divider 72A for dividing the detected frequency signal from the rotation sensor 42 of the motor, a phase comparison unit 72b to which the reference comparison frequency signal output from the foregoing M divider or PLL unit 64 is input, a low pass filter 72C to which the phase difference signal of the phase comparison unit is input, an amplifier 72D for converting the output signal from the low pass filter into an analog signal and amplifying the same, a DC-DC converter 84, and a polarity control unit 86 for controlling the polarity of the voltage signal output from this converter.

The detection signal divided in the divider 72A from the rotation sensor is input to the phase comparison unit 72B, and the phase difference signal of two signals is output to the low pass filter 72C. The detection signal from the rotation sensor 42 is input to the phase comparison unit 72B in order to form a phase difference signal, and, since the voltage signal to be applied to the motor is formed based on this phase difference signal, there is an advantage in that the rotational status of the motor is immediately reflected in the alteration of the voltage signal. Thus, this yields an effect of stabilizing the drive voltage value to be applied to the motor.

Reference numeral 72E is a threshold voltage ratio setting unit capable of setting the threshold voltage ratio of the voltage signal amplified with the amplifier 72D with the control signal from the microcomputer 60. When the speed of the motor is changed, the microcomputer selects the appropriate division value from the rotational speed of the motor or the designated speed to the motor, and sets this to the M divider or PLL circuit 64, and the N divider 72A, respectively.

Figure 9:
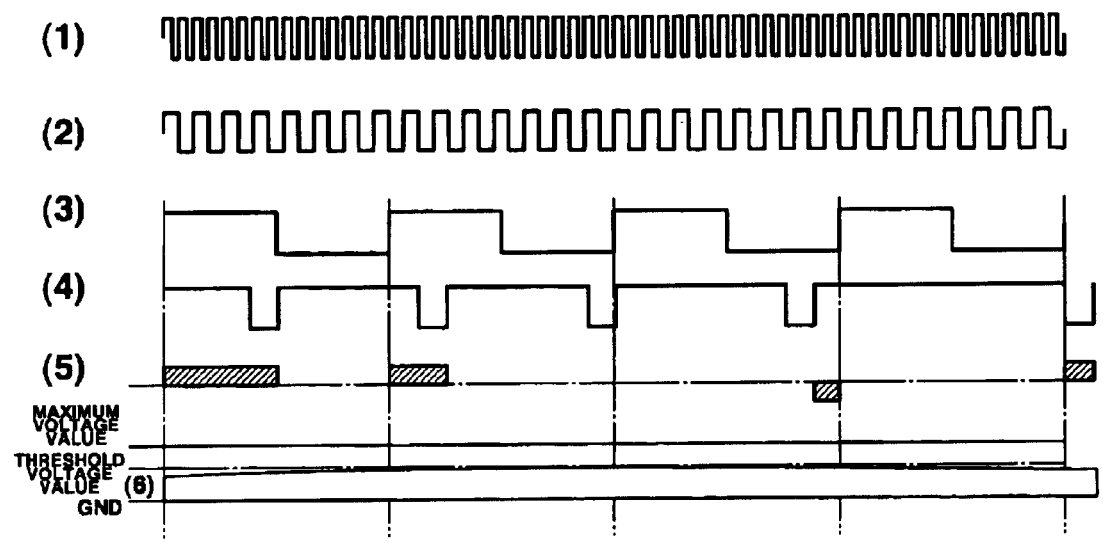
FIG. 9 is a timing chart of the drive voltage application control.

FIG. 9 is a timing chart of the drive voltage application control explained in FIG. 8(2). FIG. 9(1) is the waveform of the fundamental frequency signal from the crystal oscillator. FIG. 9(2) is the waveform of the output pulse from the rotation sensor 42. FIG. 9(3) is the waveform of the reference comparison frequency signal obtained by M dividing the fundamental frequency signal. FIG. 9(4) is the waveform of the detected frequency signal obtained by N dividing the pulse signal from the rotation sensor. FIG. 9(5) is the waveform of the phase difference signal based on the phase difference of the two detected frequency signals output as a result of the phase comparison in the phase comparison unit 72B. FIG. 9(6) is the characteristic of the voltage signal in which the phase difference signal has been analog converted and amplified. As shown in FIG. 9(5), when a phase difference arises in the two signals, the threshold voltage value as shown in FIG. 9(6) is obtained, and this is amplified in the DC-DC converter 84 then supplied to the polarity control unit 88. In FIG. 9(6), the difference between the maximum voltage value and the threshold voltage value is the threshold voltage ratio.

FIG. 10(1) shows a block diagram of the braking control circuit 74. The braking control circuit comprises, as the load, a storage cell 100A capable of charging the braking power of the motor (G), and a charging control circuit 101. Reference numeral 102A is a switch circuit which intermits the motor (power generator) and the charging control circuit. When the motor is not connected to the charging circuit, the motor enters a no-load state and begins idling. When the motor is connected to the charging control circuit, the motor functions as the dynamic braking unit since the braking current flows in the motor.

The foregoing DOWN signal is input to the switch circuit 102A from the phase comparison circuit 68. When the H level of DOWN is applied, the motor and charging control circuit are connected. Reference numeral 102B is an AC-DC conversion circuit. Reference numeral 102C is the power conversion circuit corresponding to the DC-DC converter. Reference numeral 102D is a charging power control circuit for controlling the charging voltage for charging the storage cell. The charging power control circuit 102D monitors the voltage of the storage cell 100A, outputs a prescribed voltage signal (T) to the power conversion circuit 102C, and controls the output voltage of the power conversion circuit 102C above the charging voltage.

FIG. 10(2) is a characteristic diagram showing the relationship between the motor revolution and the power generated with the power conversion unit. Pursuant to the increase in the rotational speed of the motor, the power output value of the power conversion unit will increase. FIG. 10(3) is a characteristic diagram showing the relationship between the motor revolution and the output voltage value of the power conversion unit, and, pursuant to the increase in the rotational speed of the motor, the charging power control unit 102D increases the output from the power conversion unit 102C to be above the stored voltage.

The power characteristics of the load power (braking power) of the braking control circuit can be changed by altering the duty of the load power or by altering the voltage (charging voltage) of the load power. The duty of the load power is altered pursuant to the duty of the phase difference signal (DOWN) supplied to the switch circuit 102A. Moreover, the braking current value can be changed by altering the voltage value of the load power. As described above, the threshold duty ratio is set in the threshold duty ratio setting circuit 61. The threshold voltage value is achieved by the microcomputer 60A outputting the charging voltage alteration control signal T to the charging power control unit 102D.

Figure 11:
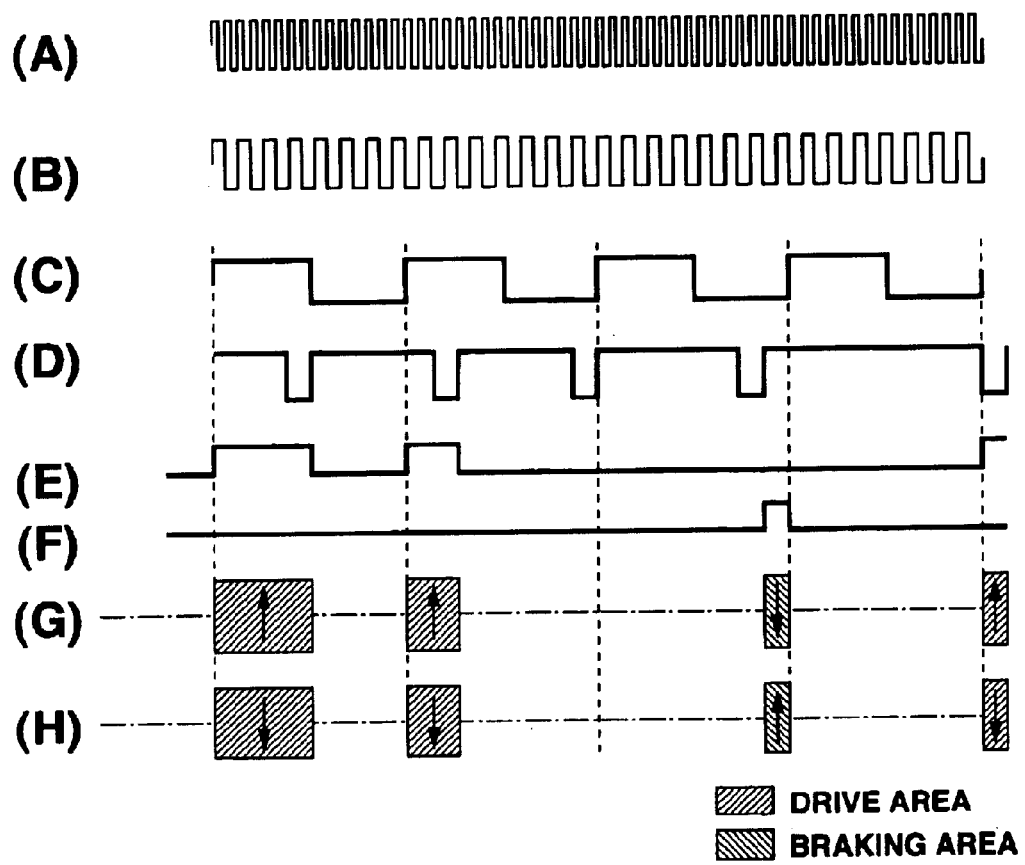
FIG. 11 is a timing chart of the phase difference control upon performing the drive control and braking control.

FIG. 11 is a timing chart of the phase difference control upon performing the drive control and braking control. FIG. 11(A) is a reference frequency signal oscillated from the fundamental frequency oscillation circuit 62, FIG. 11(B) is a detection signal output from the rotation sensor 42, FIG. 11(C) is a reference comparison signal output from the reference comparison signal forming circuit 64, and FIG. 11(D) is a sampling signal output from the N divider 70. FIG. 11(E) is the phase difference of the sampling signal of (D) and the reference comparison signal, and shows a case where the phase of the reference comparison signal is ahead of the sampling signal. Here, the phase difference signal (UP) for driving the motor is output to the drive control circuit 72. FIG. 11(F) shows a case where the phase of the reference comparison signal is behind the sample signal. Here, the phase difference signal (DOWN) for decelerating the motor is output to the braking control circuit 74.

FIG. 11(G) is the timing of the voltage (advancing direction of the vehicle) to be applied to the motor from the drive control circuit, and FIG. 11(H) is the timing of the voltage (reverse direction of the vehicle) to be applied to the motor from the drive control circuit.

FIG. 12(1) is a waveform diagram of the motor drive control timing for explaining FIG. 11 in further detail, and FIG. 12(2) is a waveform diagram of the braking control timing. In FIG. 12(1), phases of the reference comparison signal and the detection signal are compared in the phase comparison circuit 68, and, when there is a phase difference on the side of increasing the motor speed, the phase difference signal (UP) is supplied to the drive control circuit 72 throughout the period such phase difference exists. The drive control circuit 72 implements the drive control for supplying a drive voltage to the motor while the phase difference signal UP is being output.

At the transition area (acceleration period) where the acceleration of the motor begins and the motor endeavors to reach the designated speed, the phase difference signal is output for a long time, the output period of the phase difference signal begins to decrease at the stage where the actual speed of the motor reaches the designated speed, and the motor reaches the designated speed upon arriving at the stable acceleration period. When the motor speed exceeds the designated speed during the stable acceleration period, the phase difference signal (DOWN) is supplied to the braking control circuit 74, and the motor speed is brake-controlled to become the designated speed.

FIG. 12(2) differs from FIG. 12(1) in that a deceleration designation is supplied to the motor. The deceleration period is a period of decelerating the motor until the designated speed, and the phase difference signal (DOWN) in the deceleration direction of the motor is supplied to the braking control circuit 74 during this period. The output period of the phase difference signal decreases during the stable deceleration period, and there are cases where the phase difference signal (UP) is output to the side accelerating the motor.

Figure 13:
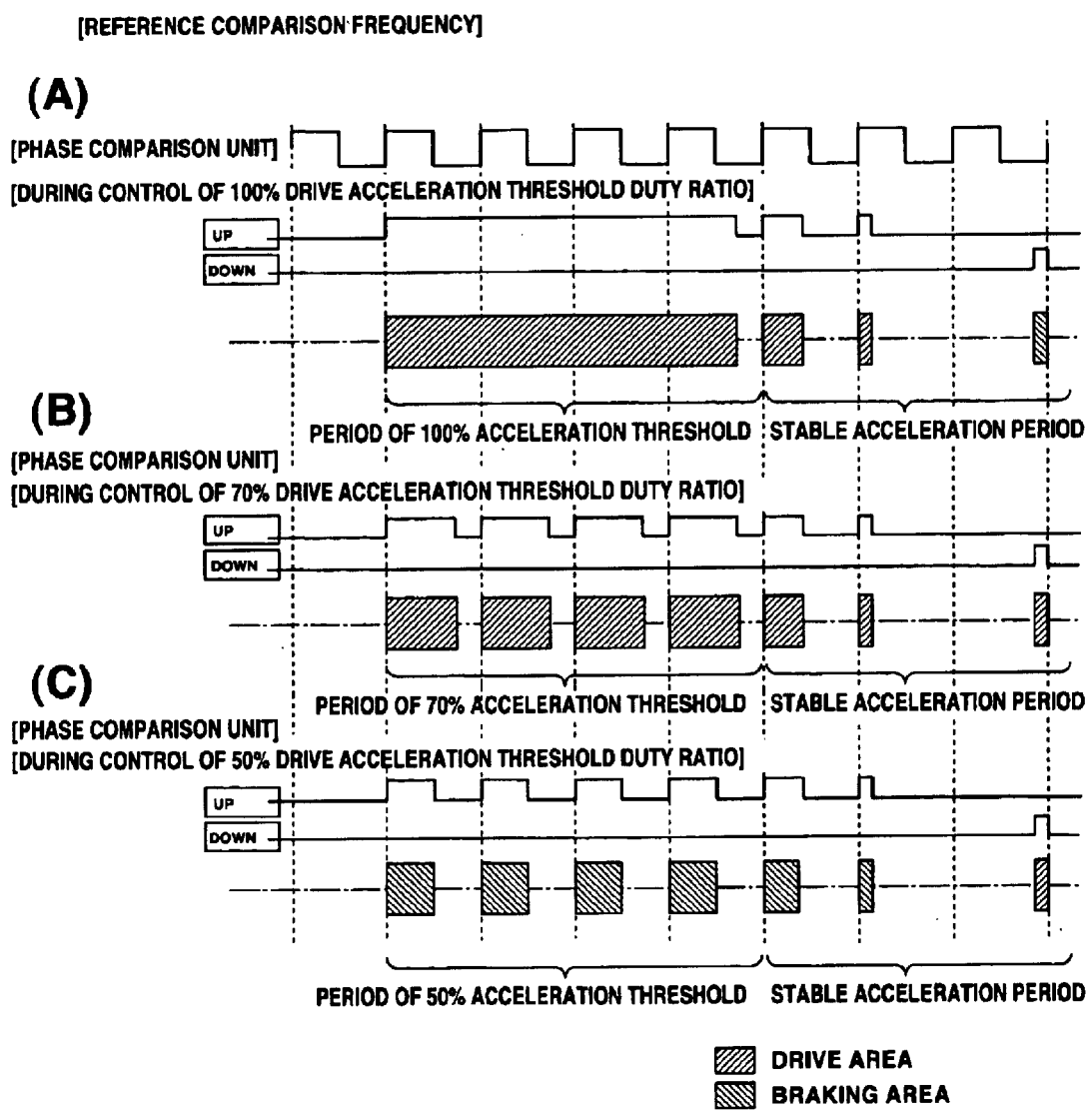
FIG. 13 is a timing chart for explaining the duty control upon performing the motor drive control.

FIG. 13 is a timing chart for explaining the duty control upon performing the motor drive control. FIG. 13(A) is a waveform where the threshold duty ratio set in the threshold duty ratio setting unit 61 is 100%, FIG. 13(B) is a waveform where the set threshold duty ratio is 70%, and FIG. 13(C) is a waveform diagram where the threshold duty ratio is 50%. The duty of the phase difference signal output from the phase comparison circuit 68 is limited as shown in (B) and (C), and input to the polarity control circuit 86. Thus, in the polarity control circuit, the drive voltage is intermitted in conformity with the duty, and the duty of the drive voltage becomes 70% as shown in (B) and the duty of the drive voltage becomes 50% as shown in (C).

Figure 14:
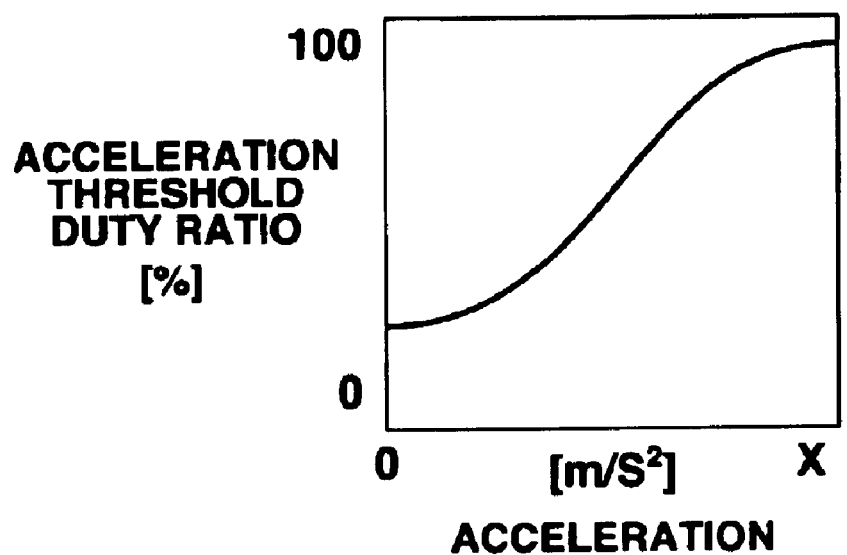
FIG. 14 is a characteristic diagram showing the relationship between the acceleration and threshold duty ratio of the vehicle (motor)

FIG. 14 shows the relationship between the vehicle (motor) acceleration and the threshold duty ratio, and the acceleration will decrease when the threshold duty ratio decreases. In other words, when the duty of the drive voltage is 50% as shown in (C), the acceleration will be approximately ½ in comparison to the 100% duty ratio, and, in the case of (B) when comparing it with (A), the time required for the vehicle speed (rotational speed of motor) to reach the designated speed will be roughly double.

Next, the relationship between the operational status of the vehicle (actuator) and the threshold duty ratio will be explained. Foremost, there is a high duty ratio mode. This would be a condition where rapid acceleration of the motor is tolerable; for example, (1) when the electric vehicle is traveling at a slow speed, (2) when the electric vehicle is advancing straight forward, (3) when the electric vehicle is running on a public road, (4) when the road surface condition is in a high friction state, and so on. Here, the duty (drive voltage) having a value where a high duty ratio is multiplied to the duty of the phase difference signal of the phase comparison unit is output to the drive circuit. As a result, the acceleration designation to the motor is conveyed to the motor approximately as is.

Secondly, there is the medium duty ratio mode. This is a mode where it is necessary to limit the acceleration designation to the motor; for example, (1) when turning a curve with a relatively large R, (2) when the electric vehicle is traveling within an area with a speed limit, (3) when the road surface condition is slightly wet, and so on.

Thirdly, there is the low duty ratio mode. This is a mode where it is necessary to significantly limit the acceleration designation to the motor; for example, (1) when the electric vehicle is running at high speed, (2) when the electric vehicle is turning a curve with a relatively small R, (3) when the electric vehicle is running within a building, (4) when the road surface condition is wet, and so on.

The duty ratio may be set by the passenger, or the microcomputer 60 may select the threshold duty ratio based on the detection signal from the various sensors and set this in the setting circuit 61. Although the threshold duty ratio was maintained during the acceleration period in the foregoing explanation, the threshold value may be successively altered during the acceleration period. The characteristic relationship between the vehicle (actuator) and the duty is stored in the prescribed area of the microcomputer memory in a storage table format.

Figure 15:
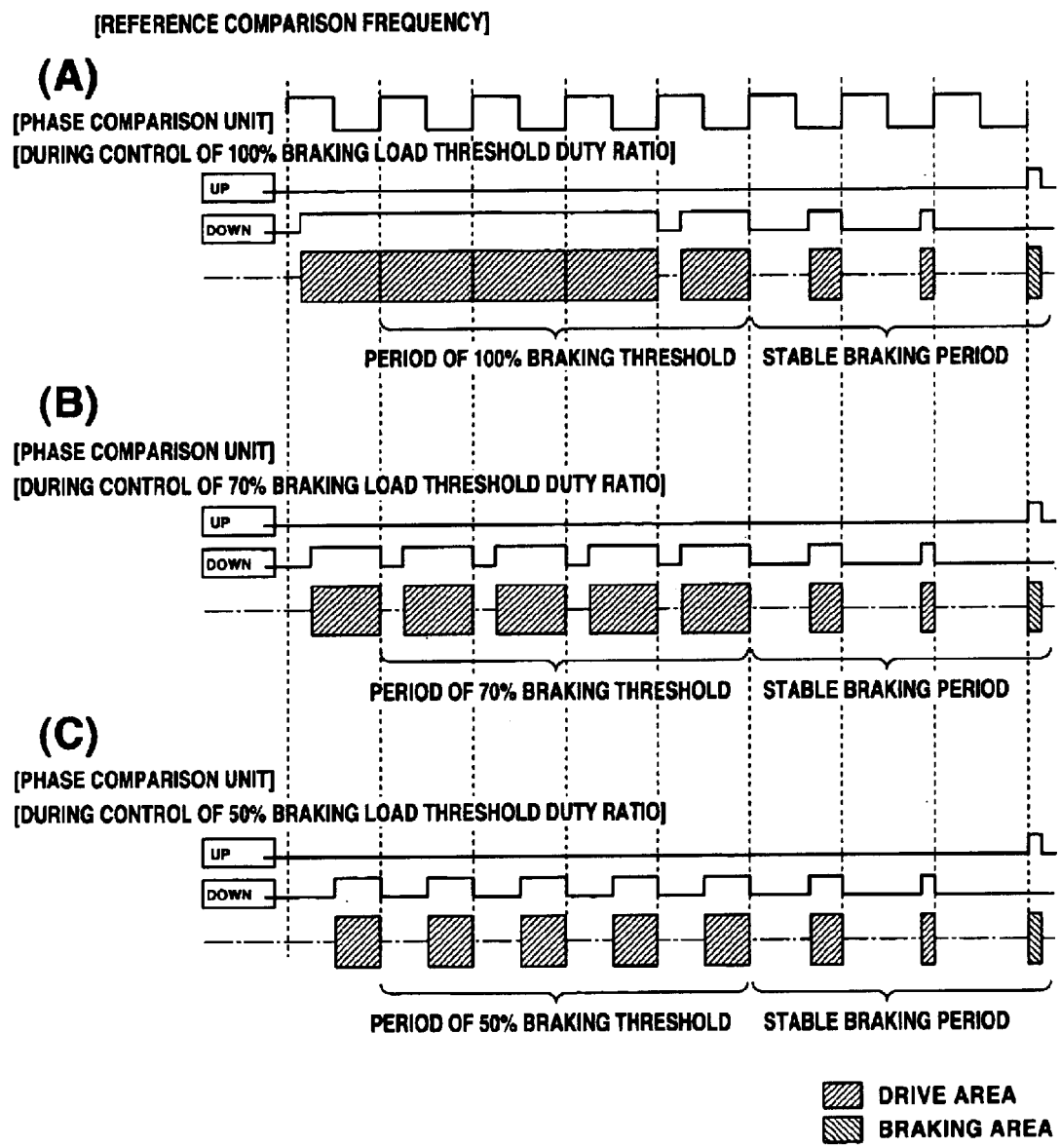
FIG. 15 is a timing chart for explaining the duty control upon performing the actuator braking control.
Figure 16:
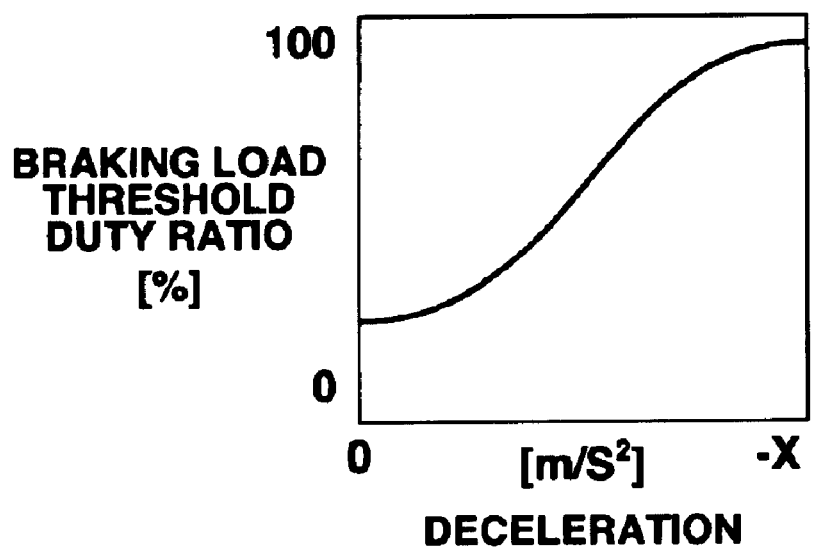
FIG. 16 is a characteristic diagram showing the relationship between the threshold duty ratio and deceleration.

FIG. 15 is a timing chart for explaining the duty control upon performing the actuator braking control. Upon performing braking control to the actuator, a phase difference signal (DOWN) in the direction for decelerating the motor is output to the braking control circuit 74 from the phase comparison circuit 68. FIG. 15(A) shows a case where the threshold duty ratio is 100%, FIG. 15(B) shows a case where the threshold duty ratio is 70%, and FIG. 15(C) shows a case where the threshold duty ratio is 50%. As shown in FIG. 16, the deceleration will decrease when the threshold duty ratio decreases. This is because the braking control circuit 74 becomes intermittent to the motor in conformity with the duty of the phase difference signal, and braking force is generated in the motor only during the period when the motor is connected to the braking control circuit 74. Thus, when the threshold duty ratio is 50%, the time required for decelerating to the prescribed speed will be double.

Let it be assumed that the operational system of the electric vehicle is structured as follows. When the passenger removes his/her foot from the accelerator pedal, the computer will judge this as a deceleration designation, and determine a prescribed deceleration designated speed. Next, the threshold duty ratio is set in the setting circuit. Here, the threshold duty ratio is set low within a range where the passenger will not feel any discomfort in the deceleration of the electric vehicle. Next, the threshold duty ratio is increased pursuant to the deceleration of the vehicle. According to this process, the acceleration on the deceleration side of the vehicle will increase pursuant to the elapse in time after the passenger's foot is released from the accelerator pedal. During this time, the phase difference signal is charged for application to the braking control circuit 74.

A brake pedal is also provided to the vehicle. When the passenger presses the brake pedal, the computer will judge the braking status of the vehicle in accordance with the depression of the brake pedal. In the case of sudden braking, a high duty ratio is set. A drum brake or disk brake may be used simultaneously, and, when the depression of the brake is large, these mechanical brakes may be activated to support the electric brake.

Figure 17:
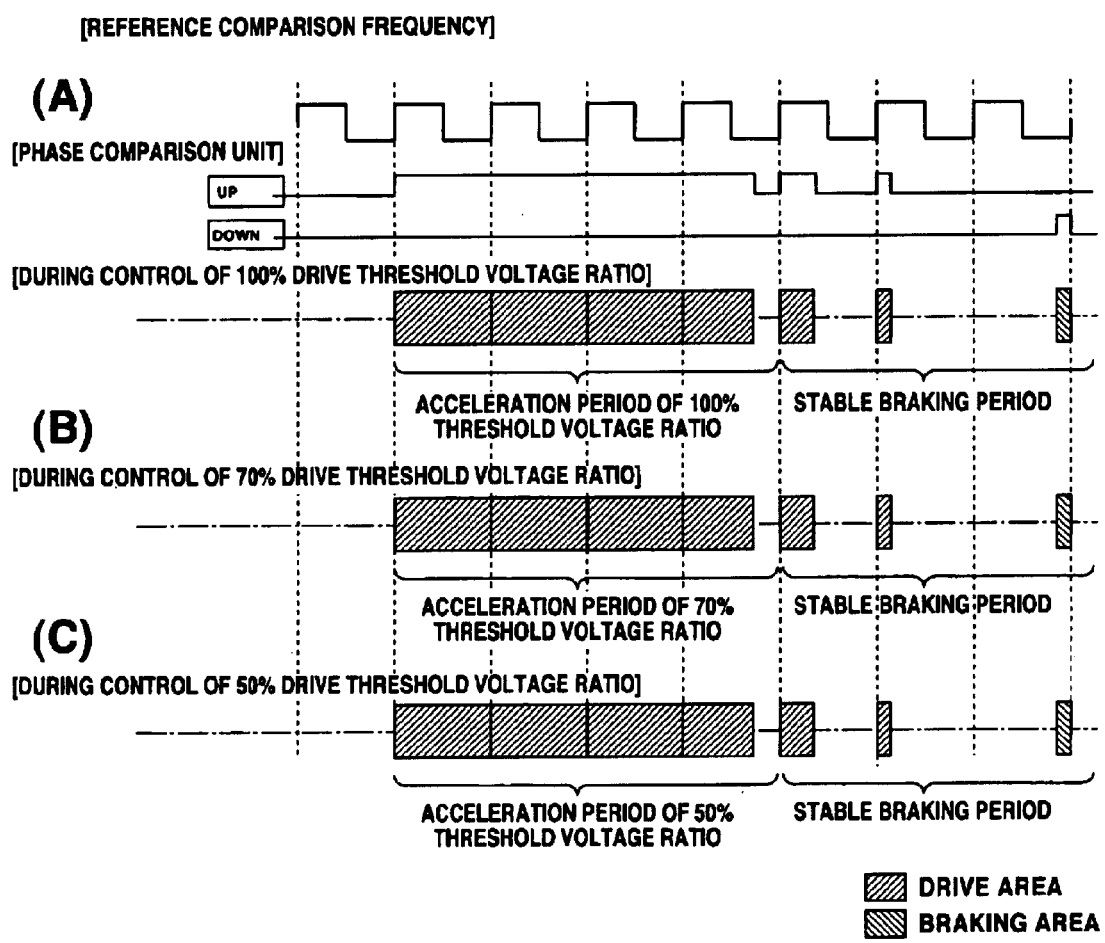
FIG. 17 is a timing chart upon controlling the threshold voltage ratio of the drive voltage applied to the motor.
Figure 18:
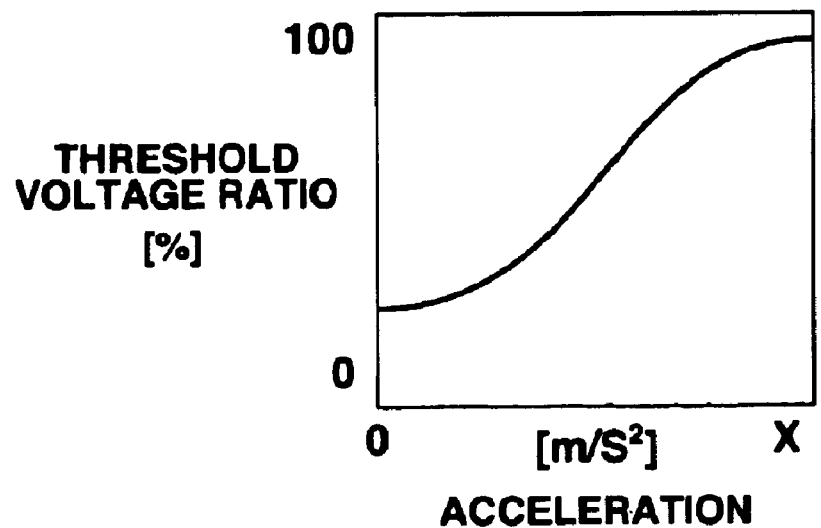
FIG. 18 is a characteristic diagram showing the relationship between the threshold voltage ratio and the vehicle (motor)

Next, the control of the threshold voltage ratio is explained. FIG. 17 is a timing chart of a case of controlling the threshold voltage ratio of the drive voltage to be applied to the motor. The microcomputer 60 sets the threshold voltage ratio in the DC output voltage setting circuit 82 or the threshold voltage setting circuit 72E. When this threshold voltage ratio is set, the voltage ratio of the drive voltage set to the motor from the polarity control unit 86 of the drive control circuit 72 is limited in accordance with the threshold voltage ratio. FIG. 17(A) shows a case where the threshold voltage ratio is 100%, FIG. 17(B) shows a case where the threshold voltage ratio is 70%, and FIG. 17(C) shows a case where the threshold voltage ratio is 50%. In the case of (B) and (C), since the driving power supplied to the motor is limited, the drive acceleration of the motor will decrease. FIG. 18 is a characteristic diagram showing the relationship of the threshold voltage ratio and the vehicle (motor). Since the drive acceleration of the motor will decrease, the acceleration period required to achieve the prescribed traveling speed will take that much longer.

Figure 19:
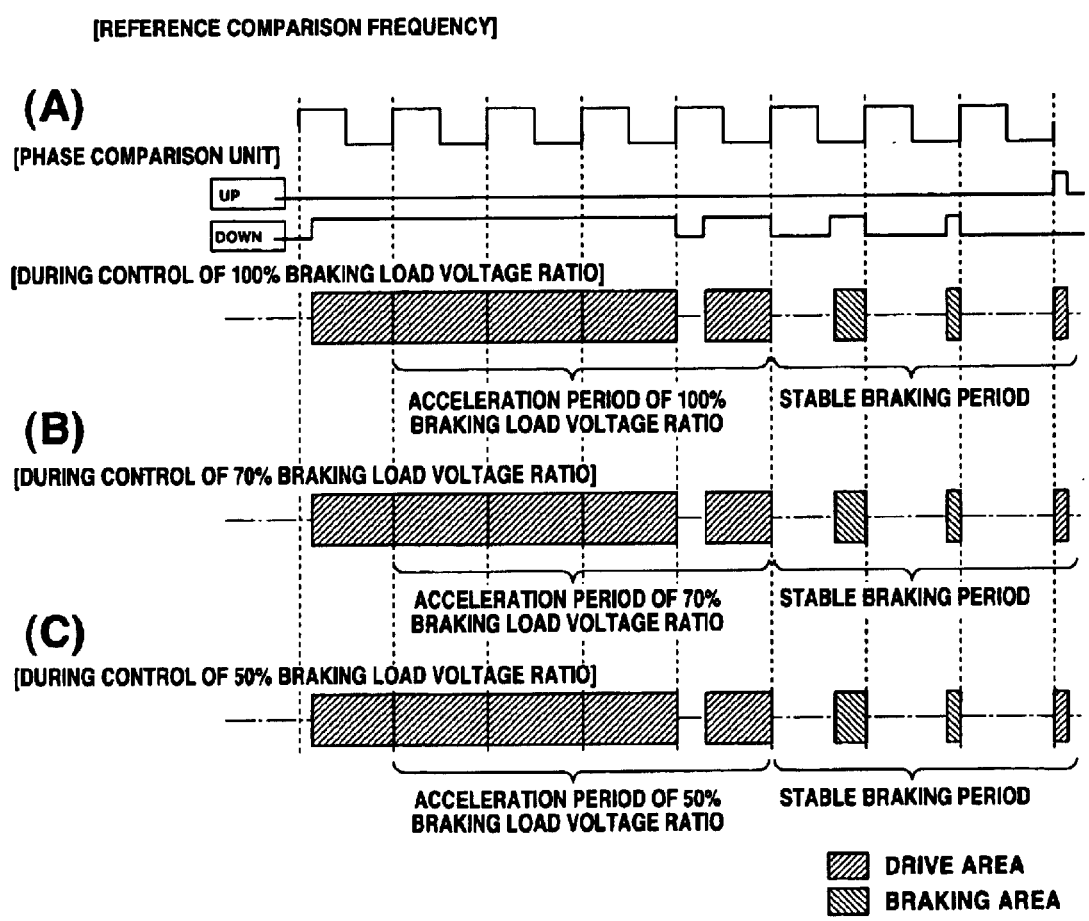
FIG. 19 is a timing chart upon controlling the braking load threshold voltage ratio of the motor load voltage.
Figure 20:
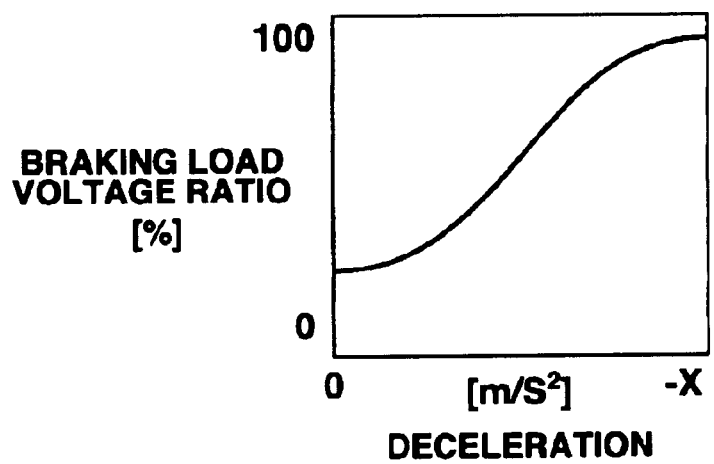
FIG. 20 is a characteristic diagram showing the relationship between the braking load voltage ratio and the vehicle (motor)

FIG. 19 is a timing chart in the case of controlling the braking load threshold voltage ratio of the load voltage of the motor. As described above, the alteration of the load voltage is achieved with the voltage control of the power conversion unit pursuant to the charging power control unit 102D. FIG. 19(A) shows a case where the threshold voltage ratio is 100%, FIG. 19(B) shows a case where the threshold voltage ratio is 70%, and FIG. 19(C) shows a case where the braking threshold voltage ratio is 50%. Pursuant to the decrease in the threshold voltage ratio, the load voltage will lower, the braking current will become small, and the braking force of the motor will be reduced. FIG. 20 is a characteristic diagram showing the relationship between the braking load voltage ratio and the vehicle (motor) deceleration.

Figure 21:
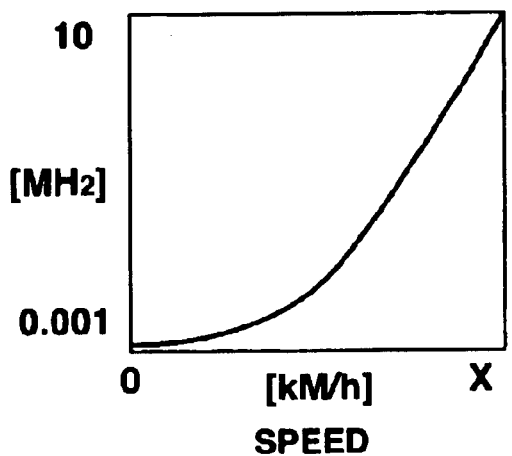
FIG. 21 is a diagram showing the relationship between the vehicle speed—reference comparison frequency characteristics.

Next, FIG. 21 shows the relationship of the vehicle speed—reference comparison frequency characteristics. Pursuant to the increase in speed, the reference comparison frequency is increasing. Increase in the reference comparison frequency is enabled, for example, by altering the M value of the M divider. When the frequency of the reference comparison signal becomes large, the occurrence of the phase difference with the detection signal becomes high, and the speed control in the high speed area can be conducted with further precision.

FIG. 22(1) is a waveform diagram in the case of performing acceleration control to the motor, and shows that the reference comparison frequency is becoming large pursuant to the increase in the rotational speed of the motor. FIG. 22(B) is the phase difference signal output to the drive control circuit 72, and FIG. 22(C) is a phase difference signal output to the braking control circuit 74. FIG. 22(D) shows that a drive voltage is applied to the motor during the acceleration period, and that a driving power or braking power is applied to the motor during the stable acceleration period. FIG. 22(2) is a waveform diagram in the case of decelerating the motor, and shows that the reference comparison signal is becoming small pursuant to the deceleration of the motor.

FIG. 23 shows a pattern diagram of the control characteristics in the case of controlling the actuator power with the combination of duty and voltage control described above. FIG. 23(1) shows a case of performing acceleration control to the motor, and, when there is a prescribed speed difference between the designated speed and actual speed of the motor, the threshold duty ratio and threshold acceleration ratio become an area enabling sudden acceleration when they are both 50% or more, become an area enabling medium acceleration when one is less than 50%, and become an are enabling low acceleration when they are both less than 50%. A–C is capable of changing the motor (vehicle) in the range of low acceleration area—medium acceleration area—high acceleration area by altering the threshold duty ratio and the acceleration voltage ratio pursuant to the alteration characteristics illustrated in the diagram. D is a mode of securing the threshold duty ratio to 100% and changing the acceleration threshold voltage ratio thereby, and E is a mode of setting the virtual threshold voltage ratio to 100% and changing the acceleration threshold duty ratio thereby. FIG. 23(2) shows the characteristics when decelerating the motor.

Figure 24:
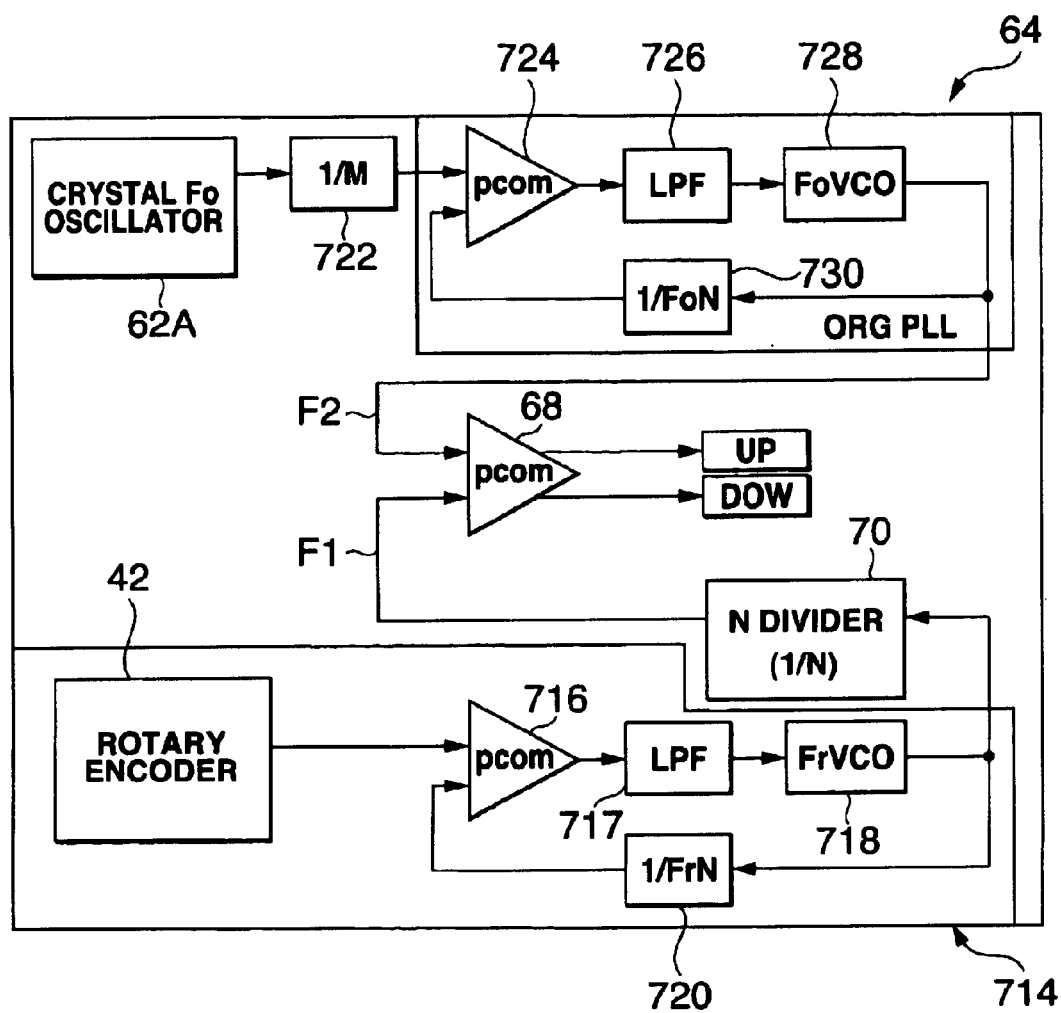
FIG. 24 is a diagram showing in detail another embodiment for a part of the block diagram illustrated in FIG. 6.

FIG. 24 shows the details of another embodiment relating to a part of the block diagram illustrated in FIG. 6. Depicted are detailed diagrams of a control block from the crystal oscillation circuit 62A to the phase comparison unit 68 via the reference comparison frequency forming circuit 64, and a control block from the rotation sensor 42 to the phase comparison unit 68.

The signal from the rotational speed sensor 42 is converted into a sampling signal to be compared with the reference frequency signal described later with the PLL control circuit 714. In other words, the signal of the rotary encoder 42 is input to the phase comparison unit 716, and the frequency signal from the voltage control oscillator 718 is compared with the phase of the frequency signal N divided at 1/Fr with the divider 720. The phase difference detection signal from the phase comparison unit 716 is supplied to the foregoing voltage control oscillator 718 via the low pass filter 717. The frequency signal from the voltage control oscillator 718 is divided in the N divider 70. As a result, a sampling frequency signal to be compared with the reference frequency signal described later is created from the sampling signal from the rotary encoder.

Meanwhile, the oscillation frequency from the crystal oscillator 62A is 1/M divided with the M divider 722 and supplied to the phase comparison unit 724, and thereafter returned to the phase comparison unit 724 via the low pass filter 726, voltage control oscillator 728 and the N divider 730. The reference frequency signal in which the frequency was made constant with the PLL control circuit 732 is supplied to the phase comparison unit 734.

The phase difference of the sampling signal F1 and the reference frequency signal F2 of the foregoing rotary encoder is compared with the phase comparison unit 734, and a control signal is supplied to the drive control device (acceleration/deceleration control device) of the stepping motor 12 for driving the rear wheels based on this phase difference.

The microcomputer 60 sets the M value of the M divider 722 and the N value of the N divider 70, 720 from the values representing the various operational statuses such as the vehicle speed or the rotational speed of the drive wheels. In other words, in the respective speeds of the vehicle, for example, an M value and N value conforming with the reference frequency, sampling frequency and phase are previously simulated and stored as a memory table in a prescribed area of the microcomputer memory. Then, such M and N values are read from the vehicle speed (target speed, detected speed, etc.), and are designated as the M or N value of the dividers 70, 720, 722, 730 of the PLL circuit. According to this embodiment, the detected frequency of the rotary encoder is divided and amplified with 720, and stabilized with the PLL block 714. The phase difference signal can thereby be obtained precisely for supplying this frequency to the phase comparison unit 68.

The PLL (Phase Locked Loop) circuit is a feedback control circuit for synchronizing the phases, and is used for controlling the output phase such that the signal having a frequency of a pulse or AC signal becomes the same phase as the reference signal. This technology is often used in spindle motors for rotating the hard disk of information processing equipment, motors for rotating the VCR heads, motors for rotating the polygon mirror for performing laser scans, and so on, and the target motor was in most cases a stepping motor or the like. With the present invention, the rotational speed of the motor can be controlled by performing inverter control even against AC motors and DC motors to be driven under a constant voltage, and, by further employing PLL technology, high-precision rotation angle control is enabled. Particularly, for example, in a case when the load against the movement of the driven plate alters, torque control becomes necessary. Nevertheless, by measuring the current speed of the driven plate, speed control is enabled in a state of adding the torque load.

As described above, according to the present invention, the control of the rotational speed of motors, which could only be driven with an ON/OFF control, is enabled, and the drive can be corrected to the designated speed. Further, speed control is realized with the PLL circuit, and stable acceleration and deceleration is thereby enabled.

Moreover, since the frequency from the crystal oscillator 62A is also output to the PLL circuit, it is possible to increase the fundamental frequency of the crystal oscillator and to generate a stable frequency.

What is claimed is:

1. A drive control device for controlling an electric rotational actuator which moves a driver, comprising:
    a reference comparison signal generation circuit for generating a reference comparison signal;
    a detection circuit for detecting the speed of said actuator and outputting this as a speed detection signal;
    a speed designation circuit of said actuator for generating a designated speed value;
    a speed comparison circuit for comparing the speed detection signal with the designated speed value and generating a designated speed signal;
    a rotation control circuit of said actuator; and
    a phase comparison circuit for comparing the phase of said reference comparison signal and the phase of said designated speed signal and outputting the comparison result to said rotation control circuit as a phase difference signal;
    wherein said rotation control circuit controls the speed of said actuator to conform with said designated speed value based on said phase difference signal, and
    wherein said reference comparison signal generation circuit divides the fundamental frequency and outputs a division ratio as the reference comparison signal, and the output of said rotation control circuit is altered in accordance with the phase comparison result.

2. A drive control device according to claim 1, wherein said reference comparison signal generation circuit, said detection circuit and said phase comparison circuit structure a PLL control block.

3. A drive control device according to claim 2, wherein said detection circuit divides the detected value from a rotation sensor of said actuator and outputs the divided value as said designated speed signal.

4. A drive control device according to claim 1 or claim 2, wherein said rotation control circuit, outputs the phase difference signal to said actuator.

5. A drive control device according to claim 1 or claim 2, wherein said rotation control circuit distinguishes whether said actuator is in an acceleration drive state or a braking drive state from said phase difference signal, and controls the operation of said actuator based on the result thereof.

6. A drive control device according to claim 5, wherein said rotation control circuit is structured of a drive control circuit for accelerating said actuator, and a braking control circuit for braking said actuator.

7. A drive control device according to claim 6, wherein a storage unit is provided which is capable of storing the braking power of said actuator as a load of said braking control circuit.

8. A drive control device according to claim 7, wherein said braking control circuit intermittently controls said storage unit and said actuator based on said phase difference signal.

9. A drive control device according to claim 6, wherein said drive control circuit intermittently controls the drive voltage supplied to said actuator based on the duty of said phase difference signal.

10. A drive control device according to claim 1, wherein said rotation control circuit comprises characteristic alteration means for altering the power characteristics of said actuator.

11. A drive control device according to claim 10, wherein said characteristic alteration means alters the duty of said actuator power.

12. A drive control device according to claim 11, wherein said characteristic alteration means alters the duty of said actuator power in accordance with the duty of said phase difference signal.

13. A drive control device according to claim 12, wherein said characteristic alteration means sets the threshold alteration ratio of said duty.

14. A drive control device according to claim 11, wherein said characteristic alteration means alters the duty of the power supply of said actuator.

15. A drive control device according to claim 10, wherein said characteristic alteration means alters the threshold value of said actuator power.

16. A drive control device according to claim 15, wherein said characteristic alteration means alters the threshold value of the power supply of said actuator.

17. A drive control device according to claim 10, wherein said characteristic alteration means alters the duty of the load power of said actuator.

18. A drive control device according to claim 10, wherein said characteristic alteration means alters the power threshold value of the load power of said actuator.

19. A drive control device according to claim 10, wherein said characteristic alteration means alters the duty of said actuator power and the threshold value thereof.

20. A drive control device according to claim 10, wherein said characteristic alteration means alters said power characteristics in accordance with the operational status of said actuator.

21. A drive control device according to claim 20, wherein said characteristic alteration means alters said power characteristics when said actuator is in the transition area of acceleration or braking.

22. A drive control device according to claim 10, wherein said characteristic alteration means alters said power characteristics in accordance with the operational status of said driver.

23. A driver comprising the drive control device according to claim 1, and an electric drive unit drive-controlled with this drive control device.

24. An electric traveling vehicle comprising:
the drive control device according to claim 1; and
an electric drive unit drive-controlled with this drive control device.

25. A drive control method for controlling an electric rotational actuator which moves a driver, comprising:
a reference comparison signal generation step generating a reference comparison signal;
a detection step for detecting the speed of said actuator and outputting this as a speed detection signal;
a speed designation step of said actuator setting a designated speed value;
a speed comparison step of said actuator comparing the speed detection signal with the designated speed value and generating a speed detection signal
a rotation control step of said actuator for controlling the speed of the actuator; and
a phase comparison step for comparing the phase of said reference comparison signal and the phase of said detection signal and outputting the phase comparison result to a rotation control circuit;
wherein said rotation control step, utilizing the rotation control circuit, controls the speed of said actuator to conform with said designated speed value based on said phase comparison result, and
wherein a reference comparison signal generation circuit divides the fundamental frequency and outputs a division ratio as the reference comparison signal, and the output of said rotation control circuit is altered in accordance with the phase comparison result.

26. A drive control device of a driver which includes a PLL control block and which supplies a designated speed signal and a reference comparison signal of the driver to a phase comparison unit and employs a phase difference signal from the phase comparison unit as a control signal of said driver;

wherein said designated speed signal is supplied to the PLL control block by a speed comparison circuit for comparing a speed detection signal with a designated speed value and generating the designated speed signal, wherein a reference comparison signal generation circuit divides the fundamental frequency and outputs a division ratio as the reference comparison signal, and wherein a rotation control circuit, altered in accordance with the phase difference signal, provides the control signal to said driver.

27. A drive control device for an electric powered vehicle including an electric motor controlled by a driver comprising:
a rotation control circuit for rotationally controlling the driver;
a speed detection circuit of said driver; and
a speed designation circuit of said driver;
wherein said rotation control circuit comprises:
a drive control circuit for outputting to said driver an acceleration control signal for accelerating said driver; and
a braking control circuit for outputting a braking control signal for brake-controlling said driver; and
wherein the acceleration of said driver to a designated speed and the deceleration of said driver to the designated speed are respectively performed by switching the output of said acceleration control signal and the output of said braking control signal.

28. A drive control device for an electric powered vehicle including an electric motor controlled by a driver comprising:
a rotation control circuit for rotationally controlling the driver;
a speed detection circuit of said driver; and
a speed designation circuit of said driver;
wherein said rotation control circuit comprises:
a drive control circuit for outputting to said driver an acceleration control signal for accelerating said driver; and
a braking control circuit for outputting a braking control signal for brake-controlling said driver; and
wherein the acceleration of said driver to the designated speed and stabilization at the designated speed and the deceleration of said driver to the designated speed and stabilization at the designated speed are respectively performed by switching the output of said acceleration control signal and the output of said braking control signal.

* * * * *